(12) United States Patent
Hanakawa et al.

(10) Patent No.: US 6,723,175 B2
(45) Date of Patent: Apr. 20, 2004

(54) FORMED MEMBER MADE OF STEEL SHEET AND METHOD FOR PRODUCING SAME

(75) Inventors: Katsunori Hanakawa, Hiroshima (JP); Kyoso Ishida, Hiroshima (JP); Mitsugi Fukahori, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 09/896,118

(22) Filed: Jul. 2, 2001

(65) Prior Publication Data

US 2002/0069938 A1 Jun. 13, 2002

(30) Foreign Application Priority Data

Jul. 4, 2000 (JP) .................................. 2000-202438

(51) Int. Cl.⁷ .............................. C23C 8/26; C23C 8/50
(52) U.S. Cl. ...................... 148/226; 148/230; 148/212
(58) Field of Search ........................................ 148/226

(56) References Cited

U.S. PATENT DOCUMENTS

| | | | |
|---|---|---|---|
| 3,847,682 A | | 11/1974 | Hook |
| 3,887,362 A | | 6/1975 | Ronay |
| 4,046,601 A | * | 9/1977 | Hook .......................... 148/221 |
| 5,753,076 A | * | 5/1998 | Costello et al. .............. 162/111 |
| 5,908,065 A | * | 6/1999 | Chadwick .................... 164/120 |
| 6,083,455 A | * | 7/2000 | Kurita et al. ................ 148/318 |
| 6,426,153 B1 | * | 7/2002 | Duley et al. ................ 435/412 |

FOREIGN PATENT DOCUMENTS

| | | | |
|---|---|---|---|
| JP | 53-042149 | | 4/1978 |
| JP | 02066255 A | * | 3/1990 .................. 428/71 |
| JP | 11-279685 A | | 10/1999 |

OTHER PUBLICATIONS

Conversion Chart of Vicers Hardness (HV) to Rockwell C (HRC), http://www.taylorspeicalsteels.co.uk/pages/main/conchart.html 1 page.*

* cited by examiner

Primary Examiner—Roy King
Assistant Examiner—Harry D. Wilkins, III
(74) Attorney, Agent, or Firm—Nixon Peabody LLP; Donald R. Studebaker

(57) ABSTRACT

A method for producing a formed member made of a steel sheet according to the present invention is characterized by preparing a steel sheet material having tensile strength of 500 MPa or less and containing a nitriding element; forming a formed member having a predetermined shape by performing a plastic forming on the steel sheet material; and performing a nitriding treatment on the formed member so that an average hardness in the sheet thickness direction of the resultant steel sheet member is Hv 300 or more by Vickers hardness, and further characterized in that the difference in hardness between the surface part and the inside center part in the thickness direction of the steel sheet member of the formed member is Hv 200 or less by Vickers hardness, thereby it is possible to reliably obtain a formed member having a sufficiently high strength after a nitriding treatment while ensuring a plastic formability of a steel sheet in obtaining a formed member made of a steel sheet member of high strength by performing a nitriding treatment after subjecting a steel sheet material to a plastic forming.

13 Claims, 19 Drawing Sheets

FORMED MEMBER MADE OF STEEL SHEET AND METHOD FOR PRODUCING SAME

BACKGROUND OF THE INVENTION

The present invention relates to a formed member made of a steel sheet member, for example, a panel member or structural member for a body of vehicles such as automobiles, and a method for producing the same.

As is commonly known, in recent years, in the field of vehicles such as automobiles and the like, there is a strong request for improving fuel efficiency from the view point of environmental problems, in addition to a request for improving the cost efficiency in vehicle running. In particular, it is requested to further reduce the weight of a body which forms a major part of the vehicle weight. On the other hand, in order to keep and improve the passenger protecting performance in the case of a collision of the vehicle, it is necessary to ensure the body strength and the body rigidity of more than certain levels.

As described above, for a body of automobile, it is required to concurrently achieve ensuring of the body strength and the body rigidity for improving the safety in the case of a collision, and reducing of weight for improving the fuel efficiency.

As is well known in the art, in order to improve the passenger protecting performance in the case of a collision of the vehicle, it is necessary to increase the strength of the steel sheet itself used for forming a panel member and a structural member of the body, or improve the structural strength by increasing the thickness of the steel sheet or by providing an additional reinforcing member.

However, of these approaches, the latter (strengthening the structure) is difficult to be adopted in principle because increase of the thickness of the steel sheet and additional provision of a reinforcing member necessarily lead to increase of the body weight.

On other hand, as for the former approach (strengthening of the steel sheet itself), it is known that only steel sheets of classes having a tensile strength up to 440 MPa (so-called 440 MPa steel sheet, of which minimum value of the tensile strength in specification is 440 MPa, actually having a tensile strength in the range of about 440 to 550 MPa) can be applied in usual, because of the restriction in ensuring plastic formability of the steel sheet by press forming and the like, and that steel sheets of higher strength are extremely difficult to be formed.

In the case of the above range of the tensile strength (approximately 500 MPa or less), however, even if an attempt is made to decrease the thickness by using a steel sheet of high strength, it is difficult to achieve a sufficient effect in regard to reduction of body weight and reduction of production costs.

By the way, as one type of heat treatment for steel materials, it is conventionally known that by subjecting a steel material containing a nitriding element (so-called nitriding steel) to a certain heat treatment (nitriding treatment), it is possible to obtain a steel member with soft inside having extremely high hardness in the surface part and the vicinity.

This nitriding treatment essentially aims at improving the abrasion resistance of the surface part while restricting increase of the inside hardness of the member and ensuring its toughness, and does not intend to improve the strength of the whole member. However, in recent years, from the view of ensuring concurrently both reduced weight and strength/rigidity of the vehicle body, consideration is made to apply surface heat treatment techniques including such a nitriding treatment on structural members and reinforcing members for an automobile. For example, Japanese Unexamined Patent Laid-Open Publication HEI 11-279685 discloses that for the purpose of producing a high-strength press formed member having excellent impact absorptivity with satisfactory dimensional accuracy and a low production cost, a steel sheet of a specific composition is subjected to a nitriding treatment after press work is completed.

Thus, in the above prior art, an effort is made to improve the strength of a steel sheet itself while ensuring press formability by subjecting the nitriding steel sheet to a nitriding treatment after being press formed. In practice, however, the strength (tensile strength) obtained after the nitriding treatment is around 700 MPa maximum which is not satisfactory. Therefore, it is not possible to obtain a significant reduction of weight and production cost solely using the teachings of Japanese Unexamined Patent Laid-Open Publication HEI 11-279685.

To improve the performance of the vehicle in protecting passengers during a collision, the structural strength of the vehicle may be improved by increasing the thickness of the steel sheet used to form body panel member and structural member of the vehicle. However, this method of increasing structural strength by increasing the sheet thickness of such body parts and structural members is not preferred if such method does not significantly increase the rigidity of the whole body since vehicle body weight and the production cost is increased.

Therefore, it is desirable to provide a one-piece press formed member having portions with different properties from other portions of the formed member which may be, for example, a body panel member or a structural member.

With regards to such a request, a so-called tailored blank method is known as a method for forming a part having different properties from other parts in a one-piece member. The tailored blank method is to join, by welding and the like, blank materials (sheet-like members) having different properties for a predetermined specification (such as sheet thickness and/or heat treatment properties) to obtain one-piece sheet member (preform), and thereafter, to perform plastic forming such as press forming to obtain a final formed member.

By employing such a method, it is possible to obtain a formed member having a part therein of which properties is different from other parts for a predetermined specification in accordance with the properties of the blank material, while generally improving yield of the sheet-like material.

Therefore, by applying the tailored blank method to the production of bodies of automobiles, it is possible to improve yield of the steel sheet material, and to form a part having different properties from that of other parts in one-piece member constitutes a portion of vehicle body. Thereby, it is also possible to determine optimum material for the steel sheet material, sheet thickness, heat treatment, surface treatment and the like, in consideration of properties to be possessed (for example, strength, rigidity, corrosion resistance and the like) and the effects of reducing the body weight and reducing the production cost.

However, in the past, in a case where a formed member having a part of higher strength than that of the other parts is attempt to formed by applying the tailored blank method, the application of the method is limited to a certain range since only the steel sheet of which tensile strength is up to about 440 MPa can be utilized in view point of keep the press formability of the steel sheet as explained above. Therefore, it is hard to achieve sufficient effect in reducing the body weight and reducing the production cost.

In the tailored blank method, a plastic forming is conducted after welding the blank materials. Therefore, in particular, in a case where a blank material having high tensile strength is used, since the mechanical properties of the blank material is remarkably different from those of the other blank material, defects such as crack or break are apt to occur at the jointed portion. This may be a major factor to limit the application of the method.

By the way, as one of the methods for reinforcing a formed member, for example, a flame member used to a body of vehicles such as automobiles, it is known to fill foam material (foam urethane resin, for example) as filler material at least a part of inside the closed section of a formed member. Thereby, it is possible to improve the strength, the rigidity and the energy absorbing property for impact load, without large increases of weight as such cases where the sheet thickness of the formed member is increased, or reinforcements are provided.

In the case of improving the strength, the rigidity and the energy absorbing property of the formed member by filling filler material inside the closed section thereof, it is known that the reinforcing effect fluctuates not only depending on the type of filler material, the mechanical properties thereof and how to fill the filler material inside the section of the formed member, but also depending on the configuration to retain and/or fix the filler material inside the section of the formed member. For example, in the case where the shear adhesive strength of the fixing portion of the filling material to inside the formed member is a certain level or less, durability of the formed member of which a part is reinforced by filling material is reduced remarkably.

Accordingly, in the past, it was considered as the fixing method, for example, to apply adhesive bonds to an inner surface of a sheet member constitutes a formed member and fix the filler material to the formed member via the adhesive layer. However, this method is disadvantageous to improve the productivity of the reinforced formed member, since an additional step for applying the adhesive bond is required, and a long time is needed for drying the adhesive applied on the sheet material of the formed member.

On the other hand, it is considerable to employ a predetermined foaming filler material as the filler material and to fix the filler material onto the inner surface of the formed member by the adhesive force of the foaming filler material itself. However, it is hard to achieve a required value of the adhesive force stably.

By the way, a so-called hydroform process is commonly known as a forming process for forming a metal member. The process comprises the following steps: forming a preform having a shape relatively approximate to the final shape of the formed member by forming a metal member having a closed section; setting the preform in a predetermine mold; and forming the preform to the final shape corresponding to a shape of the mold by supplying the closed section space thereof with a pressurized fluid to apply an internal pressure inside the closed section of the preform.

By employing the hydroform process, it is possible to form integrally a formed member of relatively complex shape without assembling a plurality of members and joining them together. Thereby, it is possible to reduce the production cost by reducing the number of parts and eliminating working steps.

In the hydroform process, a pipe-like member such as a steel pipe formed in one-piece by drawing can be employed as a metal member to be subject to the process. Also, in the case where the thickness is relatively thin in comparison with the diameter, a pipe-like formed member obtained by rolling a steel sheet and welding the rolled steel member may be used as the metal member to be subject to the hydroform process.

However, in the past, in a case where a formed steel member of high strength is attempt to formed by applying the hydroform process, the application of the process is limited to a certain range since only the steel sheet of which tensile strength is up to about 440 MPa can be utilized in view point of keep the press formability of the steel sheet as explained above. Therefore, it is hard to achieve sufficient effect in reducing the weight of the formed member and reducing the production cost.

Furthermore, with regard to the formed member obtained by the hydroform process, it is not uncommon to be required to strengthen only a specified region. Therefore, responding such a request, it is desired to make it possible to perform a partial strengthening reliably and readily.

SUMMARY OF THE INVENTION

In view of the above, it is an essential object of the invention to securely obtain a formed member having sufficiently high strength after nitriding treatment while ensuring plastic formability of a steel sheet, in the case of obtaining a formed member of a steel sheet member having high strength by performing a nitriding treatment after plastic forming using a steel sheet material.

Also, it is an object of the invention to securely obtain a formed member having a part of sufficiently high strength in comparison with that of the other parts, concurrently to improve yield of the steel sheet material.

Furthermore, it is an object of the invention to allow the foam material to be fixed to the formed member with a relatively simple configuration, and to obtain a high reinforcing effect by filling of the foam, in reinforcing the formed member by filling the foam.

Furthermore, it is an object of the invention to obtain reliably a formed member of sufficiently high strength and to make it possible to perform a partial strengthening reliably and readily.

As described above, when reduction of the body weight and reduction of the production cost are intended by strengthening the steel sheet itself, in general, the effect (particularly economical effect) differs depending on the achieved strength of the steel sheet. In view of the above-mentioned technical problems, as the result of enthusiastic researches, the inventors of the present invention have found that the achieved economical effect significantly differs at a specific tensile strength (about 1,000 MPa) as the borderline, as shown in FIG. 5.

That is, when the tensile strength of the steel sheet is less than about 1,000 MPa, only the effect that the sheet thickness of the steel sheet of the body can be set thinner in accordance with the increase of the tensile strength, however, when the tensile strength of the steel sheet is about 1,000 MPa or more, not only capable of reducing the sheet thickness but also eliminating the necessity of a reinforcing member, so that not only the body weight and the material cost can be reduced, but also the mold cost and assembling process can be eliminated, which leads a significant economical effect.

When considering reduction of body weight by strengthening the steel sheet itself (that is, by reducing the thickness of the steel sheet material), in general, it is not preferred to select such body parts and structural members that require ensuring of not only the strength but also the rigidity from the view point of the body structure (in other words, attribution with respect to the rigidity of the whole body is high) as a subject to be made thinner for reducing the weight, because even if the strength is ensured by strengthening the steel sheet itself, the reduced sheet thickness adversely affects from the view point of ensuring the rigidity. However, it is preferred to consider to apply this measurement to such body parts and structural members in which attribution with respect to the rigidity of the whole body is relatively low, and requires to keep a certain strength or higher.

Furthermore, the inventors of the present invention found in the course of carrying forward the research and development for application of this nitriding treatment technique to a steel sheet of a vehicle body, that hardness of a steel sheet having been subjected to a nitriding treatment distributes in various ways in the sheet thickness direction in accordance with a difference in the steel sheet material itself and a difference in the treatment condition, however, there is a high correlation between the average hardness and the tensile strength, so that by setting the average hardness in the sheet thickness direction at a predetermined value, it is possible to obtain a desired tensile strength in correspondence with the set value. Moreover, for the same average hardness, the larger the difference in hardness between the surface part (surface and the vicinity) and the inside center part of the sheet material increases, the lower the tensile strength and the elongation property are, and in particular, if the difference in hardness exceeds a predetermined value, the tensile strength and the elongation property abruptly decrease.

Furthermore, as the result of enthusiastic researches in applying the tailored blank method to the production of bodies of automobiles, the inventors of the present invention have found that, as for the mechanical properties of the blank materials to be joined together by welding and the like, in the case where the difference in elongation property before press forming between the both blank materials is restrained to a certain small range or approximately same level, even if a plastic forming is conducted after welding, defects such as crack or break may not occur easily at the jointed portion.

Furthermore, the inventors of the present invention found that, by subjecting a steel sheet material to a heat treatment (nitriding treatment, in particular), an intermetallic compound (nitride, in the case of nitriding treatment) having microscopic porosity (so-called porous) in the surface and the vicinity of the steel sheet is generated, so that it is possible to obtain much higher adhesive property than the case of the steel sheet not having experienced a heat treatment.

Furthermore, as the result of enthusiastic researches in applying the hydroform process to the production of a body member of automobiles, the inventors of the present invention have found that, after forming a metal material containing a predetermined heat treating elements by the hydroform process, and then subjecting the formed member to a predetermined heat treatment, thereby, the hydroform process can be performed without trouble, and concurrently, it is possible to obtain a formed member of sufficiently high strength and to make it possible to perform a partial strengthening readily.

In view of the above, a method for producing a formed member made of a steel sheet member according to a first aspect of the present invention comprises the steps of: preparing a steel sheet material having tensile strength of 500 MPa or less and containing a nitriding element; forming a formed member having a predetermined shape by performing a plastic forming on the steel sheet material; and performing a nitriding treatment on the formed member so that an average hardness in the sheet thickness direction of the resultant steel sheet member is Hv 300 or more by Vickers hardness.

The upper limit of the tensile strength of the steel sheet member was set to 500 MPa because if the tensile strength exceeds this value, plastic formability for such as press forming is significantly decreases, so that it is difficult to conduct a plastic forming. It is to be noted that a commercially available so-called 440 MPa steel sheet, of which lower limit of the tensile strength in specification is 440 MPa, has actually a tensile strength in the range of about 440 MPa to about 500 MPa. Furthermore, the lower limit of the average hardness in the sheet thickness direction of the steel sheet material after the nitriding treatment was set to Hv 300, because as described above, in order to obtain a significantly large economical effect by making it possible not only to reduce the sheet thickness but also to eliminate the necessity of a reinforcing member, as well as by making it possible not only to reduce the body weight and the material cost but also to eliminate the necessity of mold cost and assembly process for the member, it is necessary that the tensile strength of the steel sheet is about 1,000 MPa or more, and it is necessary that the average hardness is Hv 300 or more for achieving this tensile strength.

According to the method for producing a formed member made of a steel sheet member according to the first aspect of the present invention, since the tensile strength of the steel sheet material is 500 MP or less, it is possible to sufficiently ensure the plastic formability for press forming and the like before nitriding treatment. Furthermore, since the average hardness in the sheet thickness direction of the steel sheet member is 300 Hv or more, the tensile strength of the steel sheet material is about 1,000 MPa or more, it is possible to obtain a significant large economical effect. For example, when applied to a panel member or a structural member for a body of an automobile, not only capable of reducing the sheet thickness but also eliminating the necessity of a reinforcing member, so that not only the body weight and the material cost can be reduced, but also the mold cost and assembling process can be eliminated, which leads a significant economical effect.

In a second aspect of the invention, the method for producing a formed member made of a steel sheet according to the first aspect is characterized in that the steel sheet material contains as the nitriding element, a predetermined amount of at least one element of titanium (Ti), niobium (Nb), boron (B), vanadium (V) and aluminum (Al).

It is preferred that the content of titanium (Ti) is 0.14 wt % or more, the content of niobium (Nb) is 0.1 wt % or less, the content of boron (B) is 0.005 wt % or less, the content of the vanadium (V) is 0.1 wt % or less and the content of aluminum (Al) is 0.06 wt % or less.

According to the second aspect of the present invention, basically, the same effect as the first aspect can be achieved. In particular, since the above steel sheet member contains a predetermined amount of at least one element of titanium (Ti), niobium (Nb), boron (B), vanadium (V) and aluminum (Al) as the nitriding element, it is possible to obtain the heat treating effect by the nitriding treatment with reliability.

Furthermore, according to a third aspect of the present invention, the method for producing a formed member made of a steel sheet according to the first aspect is characterized in that the difference in hardness between the surface part and the inside center part in the thickness direction of the steel sheet member of the formed member is Hv 200 or less by Vickers hardness.

The upper limit in the difference in hardness between the surface part and the inside center part in the sheet thickness of the steel sheet member of the formed member was set to Hv 200, because as described above, for the same average hardness in the sheet thickness direction, the larger the difference in hardness between the surface part (surface and the vicinity) and the inside center part of the sheet material increases, the lower the tensile strength and the elongation property are, and in particular, if the difference in hardness exceeds Hv 200, the tensile strength and the elongation property abruptly decrease.

According to the third aspect of the present invention, basically, the same effect as the first aspect can be achieved. In particular, even for the same average hardness in the sheet thickness direction, as the difference in hardness between the surface part (surface and the vicinity) and the inside center part of the steel sheet member increases, the tensile strength and the elongation property decrease, however, by setting the difference in hardness between the surface part and the inside center part in the sheet thickness direction of the steel sheet member of the formed member Hv 200 or less, it is possible to prevent the tensile strength and the elongation property from abruptly decreasing, and hence realize more stable strengthening.

Furthermore, according a fourth aspect of the present invention, the method for producing a formed member made of a steel sheet according to the first aspect is characterized in that only a specific region of the formed member is strengthened by the nitriding treatment, and when the formed member bent-deforms, it deforms at a boundary between the specific region and the unspecific region as an origin.

According to the fourth aspect of the present invention, basically, the same effect as the first aspect can be achieved. In particular, since only the specific region of the formed member is strengthened by the nitriding treatment, so that when the formed member is bent to deform, it deforms at the boundary between the specific region and the unspecific region as the origin of deformation, for a one-piece formed member, it is possible to desirably control the deformation mode at the time of bent deformation without necessity of providing another member such as joint member, partial reinforcing member and the like.

Furthermore, according to a fifth aspect of the present invention, the method for producing a formed member made of a steel sheet according to the fourth aspect is characterized in that before the nitriding treatment, a masking treatment is performed on the part other than the specific region of the formed member.

According to the fifth aspect of the present invention, basically, the same effect as the fourth aspect can be achieved. In particular, since the masking treatment is performed on the part other than the specific region of the formed member before the nitriding treatment, it is possible to strengthen only the specific region of the formed member with reliability and readiness by the nitriding treatment.

Furthermore, according to a sixth aspect of the present invention, the method for producing a formed member made of a steel sheet according to the fourth aspect is characterized in that the nitriding treatment is performed while only the specific region of the formed member is immersed in a salt bath.

According to the sixth aspect of the present invention, basically, the same effect as the fourth aspect can be achieved. In particular, since the nitriding treatment is performed while only the specific region of the formed member is immersed in the salt bath, it is possible to reliably strengthen only the specific region of the formed member by the nitriding treatment without necessity of providing another process.

Furthermore, according to a seventh aspect of the present invention, the method for producing a formed member made of a steel sheet according to the first aspect is characterized in that forming the formed member having a predetermined shape is performed by a method comprising the steps of: preparing a first blank material and a second blank material having different properties for a predetermined specification as the steel sheet materials; forming a preform by joining those blank materials; and performing a plastic forming on the preform to obtain a formed member of a predetermined shape.

According to the seventh aspect of the present invention, basically, the same effect as the first aspect can be achieved. In particular, since after plastic forming the preform which has been formed by joining the first blank material and the second blank material having different properties for a predetermined specification, a specific part of the formed member obtained by the plastic forming is hardened by the nitriding treatment, it is possible to sufficiently ensure the plastic formability before heat treatment. And by the nitriding treatment performed after plastic forming provides the specific part of the formed member with a desired strength. That is, by applying the tailored blank method, it is possible to obtain a formed member having a part therein of which strength is sufficiently higher than other parts, while improving yield of the sheet-like material.

Furthermore, according to a eighth aspect of the present invention, the method for producing a formed member made of a steel sheet according to the first aspect is characterized in that the formed member has a closed section shape and is reinforced by a method comprising the steps of: setting a foam material to a region subjected to the nitriding treatment; and causing the foam material to expand by heating the formed member.

According to the eighth aspect of the present invention, basically, the same effect as the first aspect can be achieved. In particular, since after forming a formed member having a closed section shape by subjecting a sheet material containing the nitriding element to a plastic forming, the nitriding treatment is performed on at least a predetermined region of the formed member, an intermetallic compound having porosity (so-called porous) in the surface and the vicinity of the surface with respect to this predetermined region is generated. Then, since after setting a foam material to this predetermined region, the foam material is caused to expand by heating the formed member, the foam material is expanded and hardened with respect to the predetermined region of which surface and the vicinity are porous, so that it is possible to obtain much higher adhesive property than the case of the steel sheet not having experienced a heat treatment. That is, in reinforcing the formed member by filling the foam, it is possible to allow the foam to be fixed to the formed member with a relatively simple configuration, and to obtain a high reinforcing effect by filling of the foam.

Furthermore, according to a ninth aspect of the present invention, the method for producing a formed member made of a steel sheet according to the first aspect is characterized in that forming the formed member having a predetermined shape is performed by a method comprising the steps of: forming a preform having a closed section shape which is relatively approximate to the final shape of the formed member; setting the preform in a predetermine mold; and forming the preform by supplying the closed section space thereof with a pressurized fluid to obtain the formed member corresponding to a shape of the mold.

According to the ninth aspect of the present invention, basically, the same effect as the first aspect can be achieved. In particular, since the preform having a closed section shape which is relatively approximate to the final shape of the formed member is located in the predetermine mold, and by supplying the closed section space of the preform with a pressurized fluid, the formed member is hardened by the nitriding treatment after forming the formed member corresponding to the shape of the mold, it is possible to ensure satisfactory plastic formability at the time of forming before the heat treatment. And then, by the nitriding treatment conducted after the plastic forming, it is possible to provide the specific region of the formed member with a desired strength. That is, in obtaining a formed member by employing the so-called hydroform process, it is possible to reliably obtain the formed member having satisfactory strength.

Furthermore, a formed member made of a steel sheet member according to a tenth aspect of the present invention has an average hardness in the sheet thickness direction of Hv 300 or more by Vickers hardness by plastically forming a steel sheet member having a tensile strength of 500 MPa or less and containing a nitriding element into a predetermined shape and performing a nitriding treatment after the plastic forming.

The upper limit of the tensile strength of the steel sheet member was set to 500 MPa or less and the lower limit of the average hardness in the thickness direction of the steel sheet member after the nitriding treatment was set to Hv 300 for the same reason as is the case of the first aspect of the invention.

According to the formed member made of a steel sheet member according to the tenth aspect of the present invention, since the tensile strength of the steel sheet material is 500 MPa or less, it is possible to sufficiently ensure the plastic formability such as press forming before the nitriding treatment. Furthermore, since the average hardness in the sheet thickness direction of the steel sheet member after the nitriding treatment is Hv 300 or more, it is possible to make the tensile strength of this steel sheet member 1,000 MPa or more, so that significantly large economical effect can be obtained. For example, when applied to a panel member or a structural member for a body of an automobile, not only capable of reducing the sheet thickness but also eliminating the necessity of a reinforcing member, so that not only the body weight and the material cost can be reduced, but also the mold cost and assembling process can be eliminated, which leads a significant economical effect.

Furthermore, according to a eleventh aspect of the present invention, the formed member made of a steel sheet member according to the tenth aspect is characterized in that the formed member is formed to a predetermined shape by a plastic forming on a preform obtained by joining a first blank material and a second blank material having different properties for a predetermined specification.

According to the eleventh aspect of the present invention, basically, the same effect as the tenth aspect can be achieved. In particular, since after plastic forming the preform which has been formed by joining the first blank material and the second blank material having different properties for a predetermined specification, a specific part of the formed member obtained by the plastic forming is hardened by the nitriding treatment, it is possible to sufficiently ensure the plastic formability before heat treatment. And by the nitriding treatment performed after plastic forming provides the specific part of the formed member with a desired strength. That is, by applying the tailored blank method, it is possible to obtain a formed member having a part therein of which strength is sufficiently higher than other parts, while improving yield of the sheet-like material.

Furthermore, according to a twelfth aspect of the present invention, the formed member made of a steel sheet member according to the tenth aspect is characterized in that the formed member has a closed section shape and at least a part of the formed member is filled with foamed material, by setting a foam material to at least a region subjected to the nitriding treatment and causing the foam material to expand by heating the formed member.

According to the twelfth aspect of the present invention, basically, the same effect as the tenth aspect can be achieved. In particular, since after forming a formed member having a closed section shape by subjecting a sheet material containing the nitriding element to a plastic forming, the nitriding treatment is performed on at least a predetermined region of the formed member, an intermetallic compound having porosity (so-called porous) in the surface and the vicinity of the surface with respect to this predetermined region is generated. Then, since after setting a foam material to this predetermined region, the foam material is caused to expand by heating the formed member, the foam material is expanded and hardened with respect to the predetermined region of which surface and the vicinity are porous, so that it is possible to obtain much higher adhesive property than the case of the steel sheet not having experienced a heat treatment. That is, in reinforcing the formed member by filling the foam, it is possible to allow the foam to be fixed to the formed member with a relatively simple configuration, and to obtain a high reinforcing effect by filling of the foam.

Furthermore, according to a thirteenth aspect of the present invention, the formed member made of a steel sheet member according to the tenth aspect is characterized in that the formed member is formed to a predetermined shape by forming a preform having a closed section shape which is relatively approximate to the final shape of the formed member, setting the preform in a predetermine mold, and forming the preform by supplying the closed section space thereof with a pressurized fluid to obtain the formed member corresponding to a shape of the mold.

According to the thirteenth aspect of the present invention, basically, the same effect as the tenth aspect can be achieved. In particular, since the preform having a closed section shape which is relatively approximate to the final shape of the formed member is located in the predetermine mold, and by supplying the closed section space of the preform with a pressurized fluid, the formed member is hardened by the nitriding treatment after forming the formed member corresponding to the shape of the mold, it is possible to ensure satisfactory plastic formability at the time of forming before the heat treatment. And then, by the nitriding treatment conducted after the plastic forming, it is possible to provide the specific region of the formed member with a desired strength. That is, in obtaining a formed member by employing the so-called hydroform process, it is possible to reliably obtain the formed member having satisfactory strength.

DETAILED DESCRIPTION OF THE PREFERRED EMBODIMENTS

Figure 1:
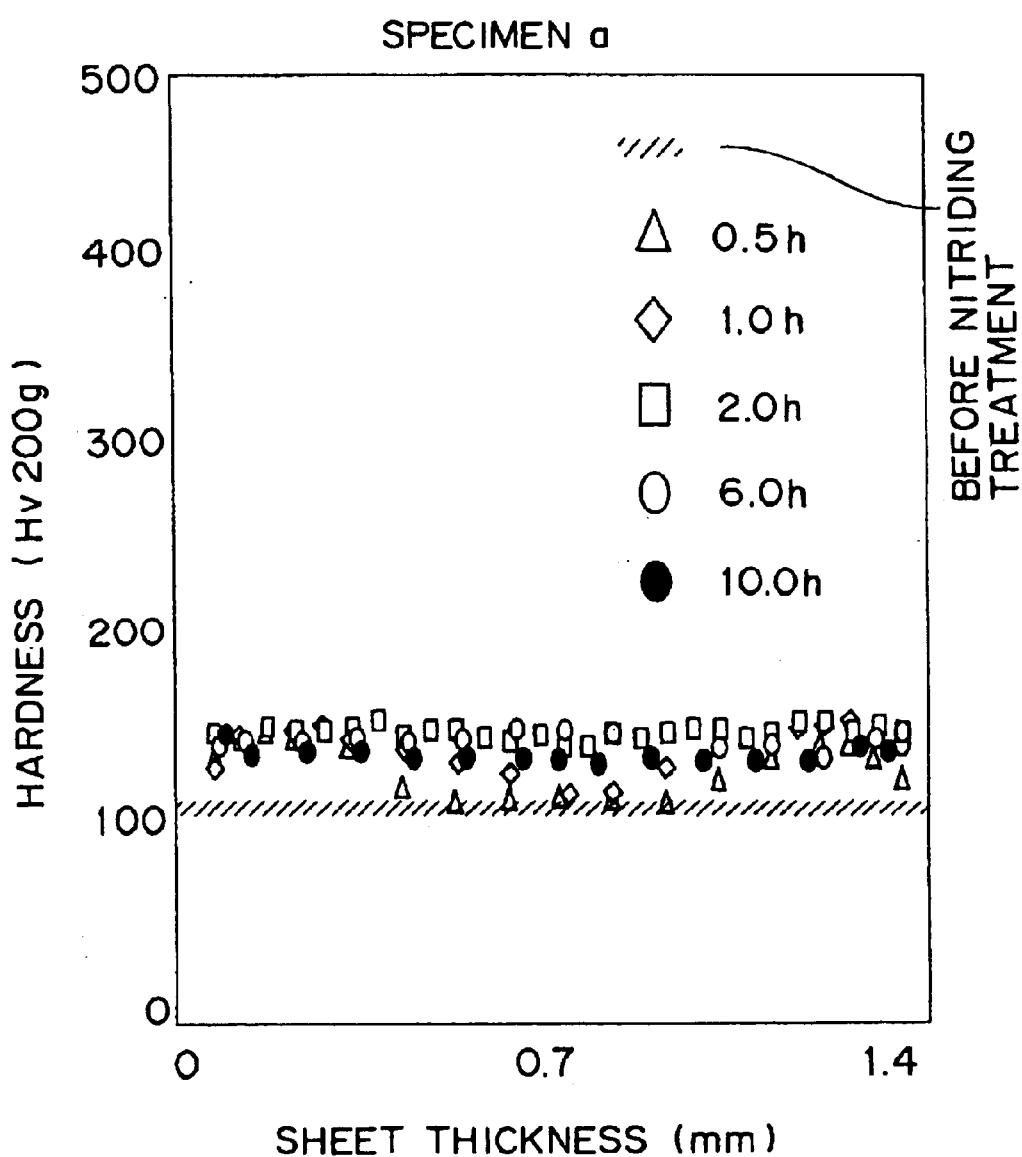
FIG. 1 is a graph showing a test result for Specimen a in a test for examining effect of alloy composition of a steel sheet material on hardness distribution and average hardness in sheet thickness direction.
Figure 2:
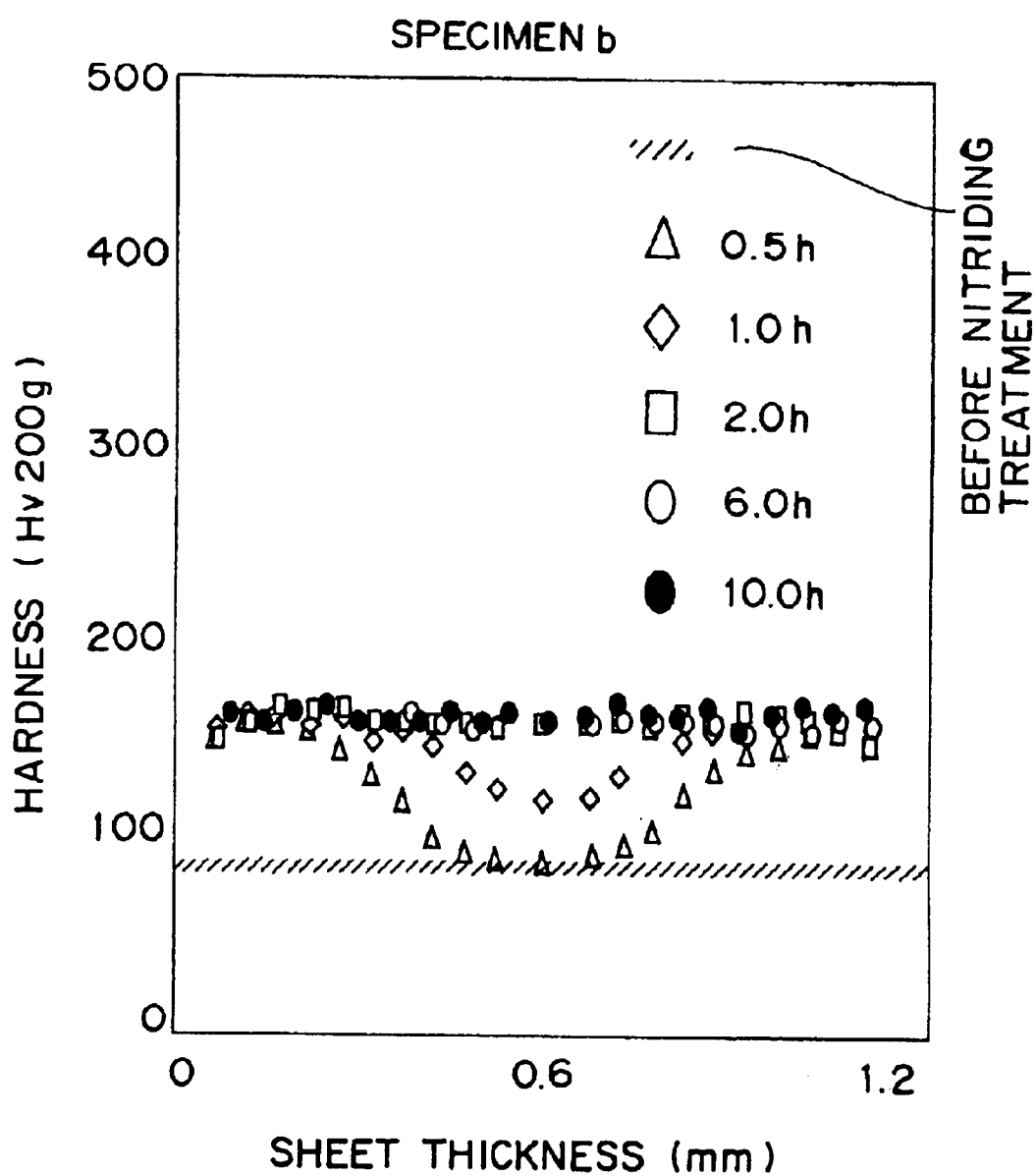
FIG. 2 is a graph showing a test result for Specimen b in the above-described test.
Figure 3:
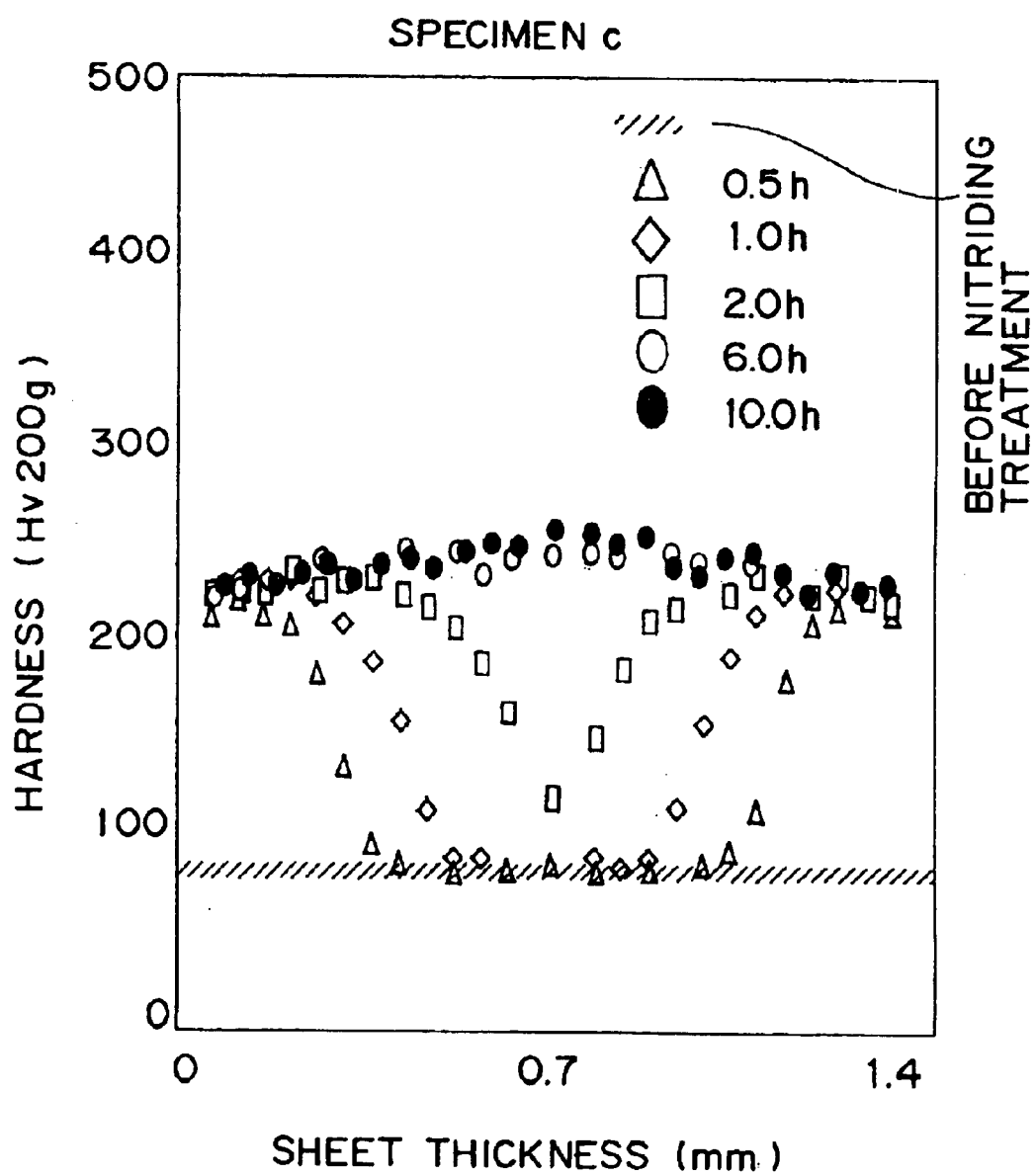
FIG. 3 is a graph showing a test result for Specimen c in the above-described test.
Figure 4:
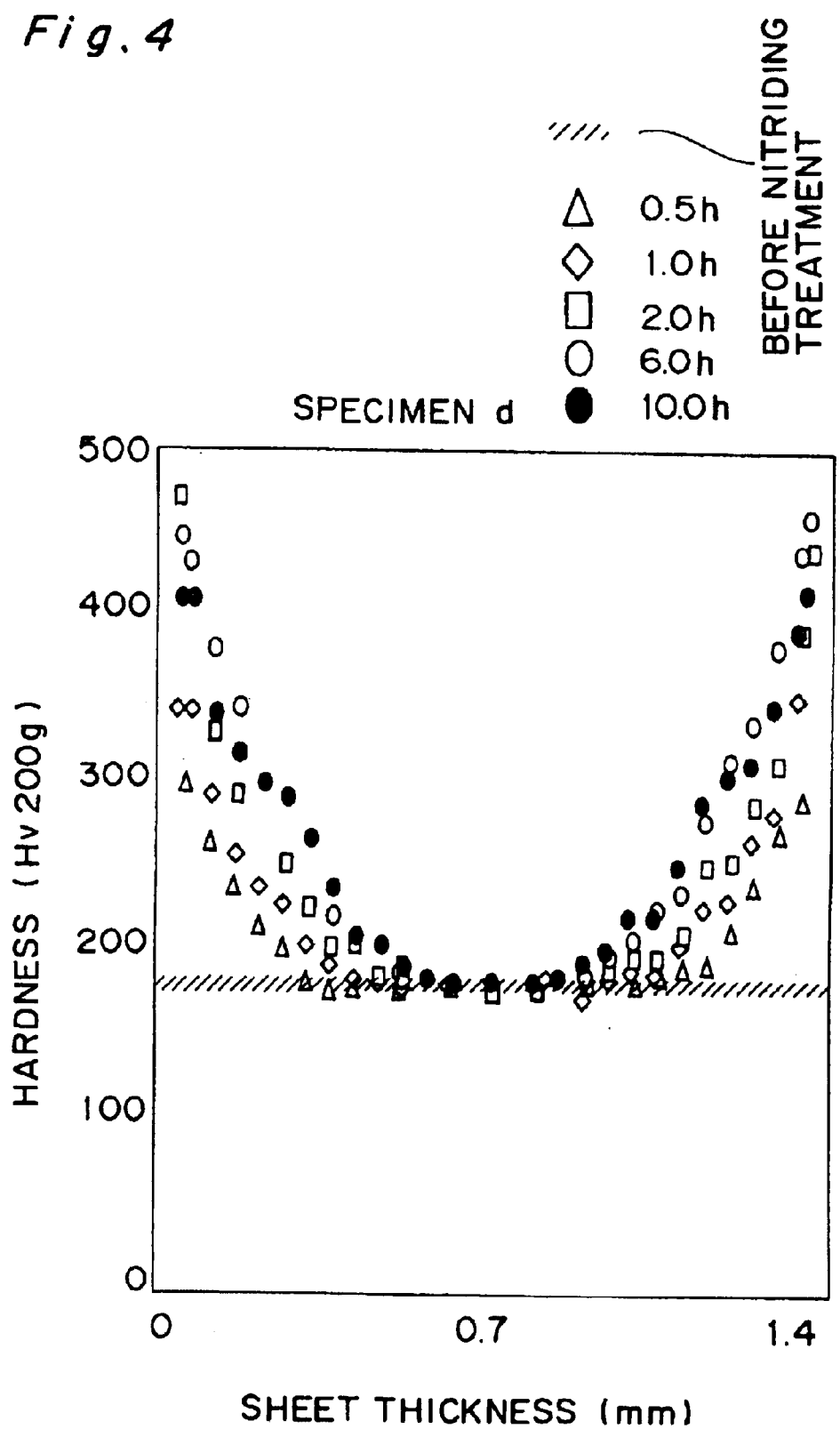
FIG. 4 is a graph showing a test result for Specimen d in the above-described test.

In the following, embodiments of the present invention will be described in detail with reference to attached drawings.

First, explanation on a steel sheet material used as a material for a formed member according to the present embodiment will be made. In the present embodiment, as a material steel sheet for the formed member, a so-called nitriding steel sheet containing a nitriding element is used, of which alloy composition includes five steel basic elements (C, Si, Mn, P and S) at a content (wt %) in the range shown in Table 1 below, and at least one of the nitriding elements at a content (wt %) in the range shown in Table 1.

The term "nitriding treatment" used herein comprehends not only a general nitriding treatment but also a carbo-nitriding treatment unless otherwise specified, and comprehends all kinds of nitriding and carbo-nitriding treatments such as liquid nitriding treatment including a salt bath nitriding treatment and gas nitriding treatment including an ion nitriding treatment.

TABLE 1

(unit: wt %)

| C | Si | Mn | P | S | Ti | Nb | B | V | Al |
|---|---|---|---|---|---|---|---|---|---|
| 0.003 or less | 0.05 or less | 0.5 or less | 0.05 or less | 0.02 or less | 0.14 or less | 0.1 or less | 0.005 or less | 0.1 or less | 0.06 or less |

The reason why the respective contents of the alloy elements are defined as seen in Table 1 is as follows.

That is, the upper limit of the content of carbon (C) was specified to 0.003 wt % because in the steel sheet material according to the present embodiment, a nitriding element such as titanium (Ti) and niobium (Nb) is added so as to improve the average hardness in the sheet thickness direction by a nitriding treatment, however, if the content of C is more than 0.003 wt %, it will combine to the nitriding element to readily precipitate carbides (TiC, NiC and the like), so that it is necessary to decrease the plastic formability before nitriding treatment as well as to add a larger amount of nitriding element.

The upper limit of the content of silicon (Si) was specified to 0.05 wt % because if the content of Si is more than this limit, the amount of solid solution into a ferrite structure becomes large to deteriorate the plastic formability before nitriding treatment, and it will combine to nitrogen (N) at the time of nitriding treatment to readily precipitate a nitride (SiN), so that it becomes difficult to realize flat distribution of hardness in the sheet thickness direction by allowing N to go inside the steel sheet material The upper limit of the content of manganese (Mn) was specified to 0.5 wt % because Mn is a solid solution strengthening element which is solid soluble in a ferrite structure, and it adversely affects on N going inside the steel sheet material at the time of nitriding treatment, while combining to sulfur (S) to precipitate MnS, causing a surface flaw, so that it is necessary to restrict the content of Mn, preferably to 0.5 wt % or less.

The upper limit of the content of phosphorus (P) was specified to 0.05 wt % because P is a solid solution strengthening element which is solid soluble in a ferrite structure, and it deteriorates the plastic formability before nitriding treatment, as well as adversely affects on N going inside the steel sheet material at the time of nitriding treatment, so that it is necessary to restrict the content of P, preferably to 0.05 wt % or less.

The upper limit of the content of sulfur (S) was specified to 0.02 wt % because S will combine to Mn to precipitate MnS, causing a surface flaw, as described above, so that it is necessary to restrict the content of S, preferably to 0.02 wt % or less.

The lower limit of titanium (Ti) was specified to 0.14 wt % because Ti is capable of causing C or N which is solid solved in a ferrite structure to precipitate to be fixed, thereby increasing the plastic formability of the structure, and in addition, it is a nitride forming element and able to precipitate a nitride of higher hardness (TiN) by being added at the content of 0.14 wt % or more, thereby improving the average hardness in the sheet thickness direction. If the content is less than 0.14 wt %, the above effect is not satisfactory.

Similar to Ti, niobium (Nb) is also capable of causing C or N which is solid solved in a ferrite structure to precipitate to be fixed, thereby increasing the plastic formability of the structure, and in addition, it is a nitride forming element and able to precipitate a nitride of high hardness by being added, thereby improving the average hardness in the sheet thickness direction by nitriding treatment. Preferably, by adding Nb at the content of 0.04 wt % or more, it is possible to achieve this effect more securely. The upper limit of the content of Nb was specified to 0.1 wt % because if Nb of an amount exceeding this limit is added, the effect will be saturated.

Boron (B) precipitate a nitride (BN) by a nitriding treatment and is capable of improving the average hardness in the sheet thickness direction by the nitriding treatment. Preferably, by containing B at the content of 0.001 wt % or more, it is possible to achieve this effect more securely. The upper limit of the content of B was specified to 0.005 wt % because if the content of B exceeds this limit, the plastic formability before nitriding treatment will be deteriorated.

Vanadium (V) promotes diffusion of N and precipitate a nitride (VN), and when contained in a certain amount more than 0 (zero) wt %, it can improve the average hardness in the sheet thickness direction by nitriding treatment. The upper limit of the content of V was specified to 0.1 wt % because if the content of V exceeds this limit, a large amount of nitride is precipitated on the surface side of the steel sheet, which prevents N from going inside the steel sheet, making it impossible to satisfactorily harden the inside of the steel sheet, so that it becomes difficult to achieve flat distribution of hardness in the sheet thickness direction.

Aluminum (Al) is a nitride forming element, and by adding Al, it is possible to improve the hardness. Preferably, by containing 0.03 wt % or more of Al, it is possible to improve this hardening effect more securely. The upper limit of the content of Al was specified to 0.06 wt % because if the content of Al exceeds this limit, hardening on the surface side becomes significant, so that it become difficult to achieve flat distribution of hardness in the sheet thickness direction.

As described above, by making the steel sheet material contain at least one element of titanium (Ti), niobium (Nb), boron (B), vanadium (V) and aluminum (Al), it becomes possible to securely achieve the effect of heat treatment by a nitriding treatment. Among the above nitriding elements, mainly Ti is used, and preferably other nitriding elements (Nb, B, V and Al) are used as auxiliary elements of Ti as necessary. That is, there is a case that addition of too large amount of one type of element (Ti) as the nitriding element is not preferable, and in such a case, it is preferred to add an appropriate amount of other nitriding elements (Nb, B, V and Al) while restricting the content of Ti to a certain degree.

<TEST 1>

Before starting explanation on specific examples of formed member and production method according to the present embodiment, explanation will be made on various tests and test calculations conducted for examining various mechanical properties and obtainable tensile strengths, and economical effects (the effect on reduction of body weight of an automobile and cost reduction) of steel sheets which are obtainable by using various specimens and samples and subjecting them to nitriding treatment.

First, Test 1 was conducted for examining the effect of alloy composition of a steel sheet material on hardness distribution and average hardness in the sheet thickness direction after nitriding treatment. The type of steel, material and sheet thickness and alloy composition (basic 5 elements) of each of Specimens a to d used in this test were as shown in Table 2. The specification to which these specimens conform is the Japan Iron and Steel Federation Standard (JFS).

TABLE 2

(Unit: wt %)

| Specimen | Type of steel | Material and Sheet thickness | C | Si | Mn | P | S |
|---|---|---|---|---|---|---|---|
| a | Low carbon steel | JFS JSH270C 1.4t | 0.04 | 0.003 | 0.27 | 0.015 | 0.006 |
| b | Ultra low carbon steel | JFS JSC270E 1.2t | 0.002 | 0.01 | 0.11 | 0.013 | 0.004 |
| c | Ultra low carbon steel | JFS JSC260G 1.4t | 0.001 | 0.004 | 0.1 | 0.007 | 0.004 |
| d | High tensile steel | JFS JSC590Y 1.4t | 0.08 | 0.72 | 1.4 | 0.015 | 0.002 |

Specimen a is a so-called low carbon steel, in which the contents of Si, Mn, P and S conform with the specified range shown in Table 1 above, while the content of C is significantly large (more than 10 times of the upper limit). Further, Specimen d is a so-called high tensile steel, in which the contents of alloy elements other than P and S significantly exceed the specified ranges shown in Table 1 above, and has a tensile strength of 440 MPa or more.

Specimen b and Specimen c both are a so-called ultra low carbon steel, which contain titanium (Ti) that will combine to carbon (c) and nitrogen (N) solid solved in the ferrite structure to precipitate carbide and nitride (usually, a ultra low carbon steel contains about 0.05 wt % of Ti), and the Specimen c contained more Ti than Specimen b.

Each of Specimens a to d was subjected to a nitriding treatment under the same treatment condition (gas carbonitriding treatment under the atmosphere of 570° C.). Five samples from each specimen which were obtained from nitriding treatments of varying nitriding treatment times from 0.5 hour (h) to 10.0 hours (h) were measured for distribution of Vickers hardness (Hv: measuring load 200 g) in the sheet thickness direction.

The measurement results were as shown in FIGS. 1 to 4. As is well understood from these measurement results, though Specimen a has high hardness of mother material before nitriding treatment because it contains more C than Specimens b and c, however, the amount of increase in hardness due to nitriding treatment is extremely small. Furthermore, in the case of Specimen a, the difference in hardness between the surface part of the steel sheet and the center part in the sheet thickness direction was significantly small, and the hardness distribution in the sheet thickness direction exhibited a nearly flat (plane) shape. In the case where the time of nitriding treatment was made longer, an effect of making the hardness distribution in the sheet thickness direction flatter was slightly observed, however, since the hardness level (average hardness in the sheet thickness direction) is originally low, so that the effect is not so significant.

As described above, it is confirmed that in the case of the Specimen a, the average hardness in the sheet thickness direction after nitriding treatment is low, and the hardness distribution in the sheet thickness direction thereof is nearly flat.

In the case of Specimen b, increase amount of hardness due to nitriding treatment is larger than that of the Specimen a, but lower than that of the Specimen c. Furthermore, the difference in hardness between the surface part and the inside center part in the sheet thickness direction of the steel sheet is large when the nitriding treatment time is short, however, the longer treatment time, the smaller the difference becomes so that the hardness distribution in the sheet thickness direction exhibits a nearly flat (plane) shape. An effect of making the hardness distribution in the sheet thickness direction flatter by increasing the nitriding treatment time is clearly observed.

As described above, it is confirmed that in the case of Specimen B, the average hardness in the sheet thickness direction after nitriding treatment becomes slightly higher (than the case of Specimen a), and the hardness distribution in the sheet thickness direction is nearly flat, for a certain treatment time or more.

In the case of Specimen c, the amount of increase in hardness caused by nitriding treatment is larger than that of Specimen b. This would result from that Specimen c contains a larger amount of Ti than that of Specimen b. On the other hand, the difference in hardness between the surface part and the inside center part in the sheet thickness direction of the steel sheet is significantly large when the nitriding treatment time is short, however, the longer the treatment time, the smaller the difference becomes so that in the case of a treatment time of 6 hours or more, the hardness distribution in the sheet thickness direction exhibits a nearly flat (plane) shape as a whole though there remains a slight dilation. Also in the present case, the effect of making the hardness distribution in the sheet thickness direction flatter by making the nitriding treatment time longer is clearly observed.

As described above, in the case of Specimen c, it is confirmed that in the case of Specimen c, the average hardness in the sheet thickness direction after nitriding treatment becomes higher (than the case of Specimen b), and the hardness distribution in the sheet thickness direction is nearly flat, for a certain treatment time or more.

In the case of Specimen d, by extending the nitriding treatment time, a considerably high value for the average hardness in the sheet thickness direction is obtained, however, even when a nitriding treatment of longer time is conducted, almost no increase in hardness in the inside center part of the sheet thickness direction of the steel sheet and its vicinity is observed, the difference in hardness between the surface part and the inside center part in the sheet thickness direction of the steel sheet is extremely large, and the hardness distribution in the sheet thickness direction exhibits an inversed parabola shape as a whole. This would result from that a large amount of alloy elements are contained, and N cannot go inside the steel sheet because of precipitating of nitrides in the vicinity of the surface, so that the increase in hardness by nitriding treatment is limited to the surface and its vicinity.

As described above, it is confirmed that in the case of Specimen d, by performing a nitriding treatment of a certain treatment time or more, it is possible to increase the average hardness in the sheet thickness direction, however, it is impossible to increase the hardness of the nearly center part and its vicinity in the sheet thickness direction, so that the difference in hardness between the surface part and the center part in the sheet thickness direction of the steel sheet becomes significantly large.

In measurement of hardness as described above, average hardness in the sheet thickness direction was calculated in such a manner that Vickers hardness is measured for every predetermined plot width (for example, 0.05 mm wide) in the sheet thickness direction, for example, and all these measurements are averaged to calculate the average hardness. Alternatively, it is also possible to calculate the average hardness by connecting all the points of measurement thus plotted to draw a hardness distribution curve, calculating the area of the region surrounded by this hardness distribution curve and the coordinate axes (reference line of hardness of zero and a pair of reference lines representing ends of the sheet member), and dividing this area by the sheet thickness.

<Test 2>

Next, a test for examining the correlation between tensile strength of the steel sheet and the average hardness in the sheet thickness direction after nitriding treatment was conducted. In this test, a number of samples having different average hardnesses in the sheet thickness direction after nitriding treatment extending in a wide range (range of approximately Hv80 to Hv 330) were prepared by modifying the steel type and chemical composition, or the condition of nitriding treatment in various manner, and the tensile strength was measured for each sample to examine the correlation with the average hardness.

Figure 6:
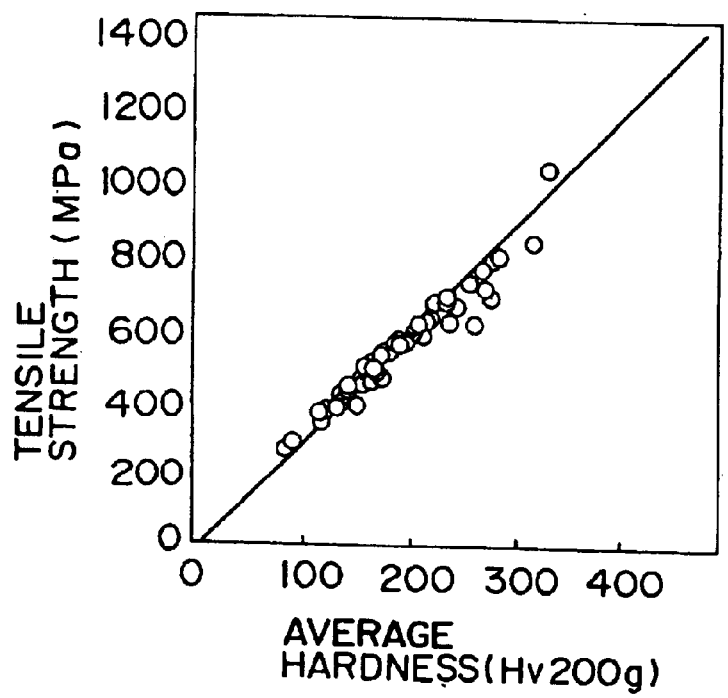
FIG. 6 is a graph showing a correlation between tensile strength and average hardness in sheet thickness direction of a steel sheet.

The test results are shown in FIG. 6, and it was confirmed that there is a high correlation between the average hardness in the sheet thickness direction of the steel sheet after nitriding treatment (Vickers hardness Hv: measuring load 200 g) and the tensile strength.

In the case where an attempt is made to reduce the body weight and reduce the production cost by increasing the strength of the steel sheet itself used for forming a body panel or a structural member, the effect (especially economical effect) will differ depending on the achieved strength of the steel sheet. In view of this, an economical effect which can be obtained when the tensile strength of the steel sheet is increased to about 440 MPa or more which is the upper limit from the view point of ensuring the press formability was test calculated by simulation. This trial calculation was conducted for a body of automobile of passenger car type as an subject.

Figure 5:
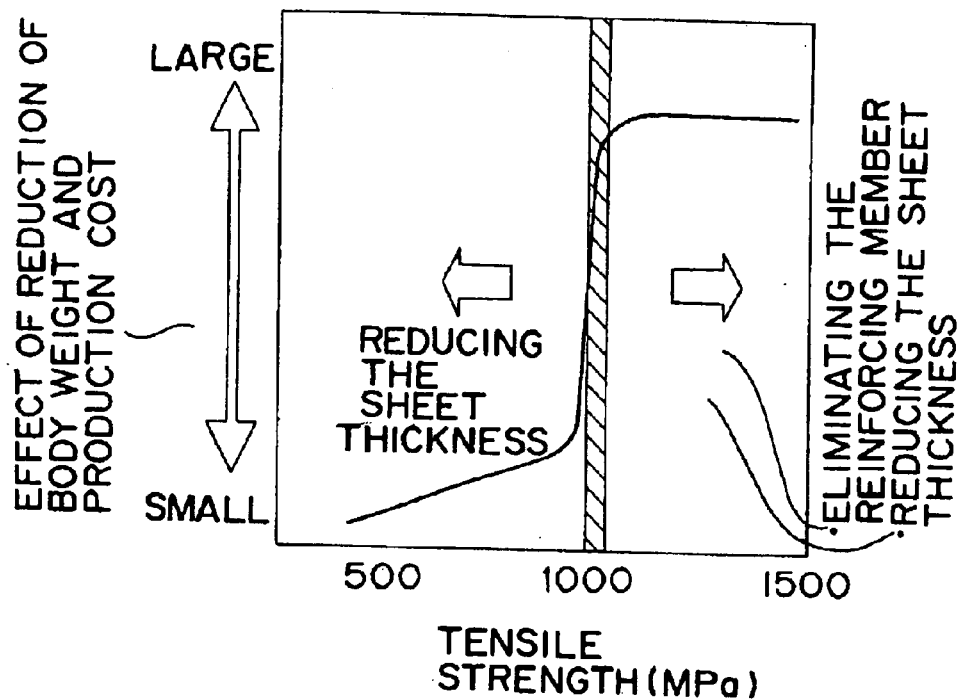
FIG. 5 is a graph schematically showing a relationship between tensile strength of a steel sheet and effect on reducing body weight of an automobile and production cost thereof.

As a result of this, as shown in FIG. 5, it was found that a significant difference arises in the economical effect at a certain tensile strength and its vicinity (in the present test calculation, approximately around 1,000 MPa) as the boundary. That is, in the case where the tensile strength of the steel sheet is less than about 1,000 MPa, only the effect that the sheet thickness of the body steel sheet can be set thinner in accordance with the improvement of the tensile strength is achieved, while in the case where the tensile strength of the steel sheet is about 1,000 MPa or more, not only the sheet thickness can be made thinner, but also the necessity of reinforcing members can be eliminated, with the result that not only reduction of body weight and reduction of material cost can be achieved due to elimination of such reinforcing members, but also the necessity of mold costs and assembly processes are eliminated, which significantly increases the economical effect.

And with reference to the test results of the above test (FIG. 6), it can be seen that the average hardness in the sheet thickness of approximately Hv 300 or more can achieve the tensile strength of approximately 1,000 MPa or more so as to accomplish the above-mentioned significant economical effect.

<Test 3>

Next, a test for examining an influence of the hardening pattern, that is, the distribution shape of the hardness distribution in the sheet thickness direction after nitriding treatment (in other words, difference in hardness between the surface part and the center part in the sheet thickness direction of the steel sheet) on tensile strength and elongation property of the steel sheet was performed. In this test, a number of samples having the same average hardness in the sheet thickness direction (for example, Hv 280) and different hardening patters were prepared, and the tensile strength and the elongation of each sample was measured to determine the relationship with the difference in hardness.

Figure 7:
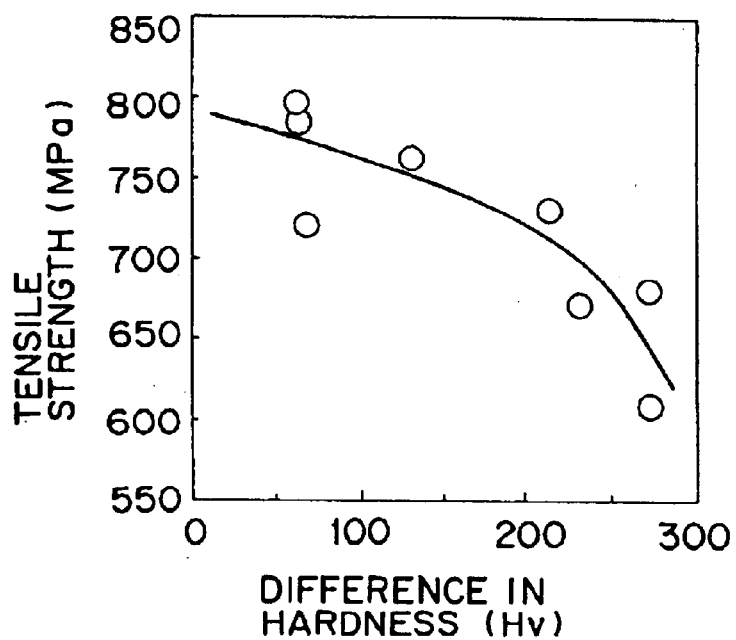
FIG. 7 is a graph showing a relationship between tensile strength and difference in hardness in sheet thickness direction of a steel sheet.
Figure 8:
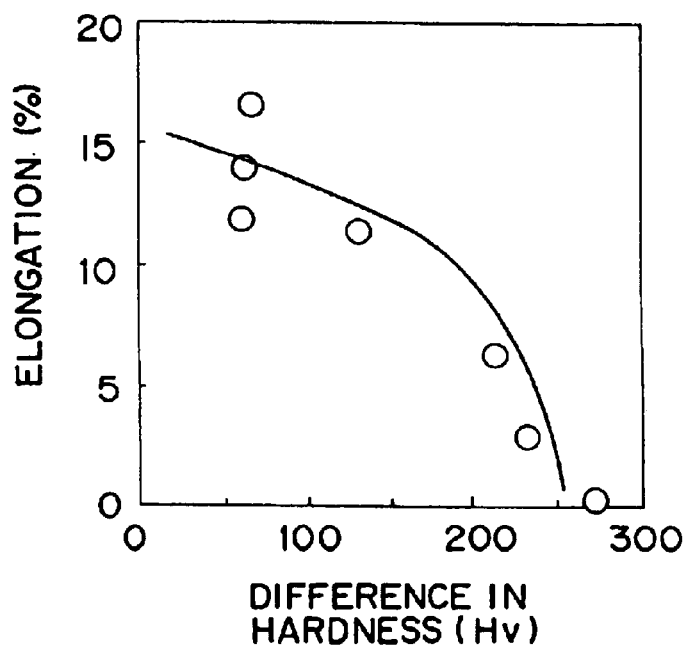
FIG. 8 is a graph showing a relationship between elongation property and difference in hardness in sheet thickness direction of a steel sheet.

The test results are shown in FIG. 7 (tensile strength) and FIG. 8 (elongation property) and it was found that the larger the difference in hardness between the surface part and the center part in the sheet thickness direction of the steel sheet, the lower the measurement for both the tensile strength and the elongation property. This would results from that since the surface part of the steel sheet is harder than the inside, when the tensile load acts in the longitudinal direction of the steel sheet, basically the surface is unlikely to elongate and only the inside is likely to elongate, so that the stress concentrates in the surface part to cause a crack and lead decrease of the strength due to rapid propagation of the crack.

Furthermore, it is also confirmed that such decrease of the tensile strength and decrease of the elongation due to increase difference in hardness between the surface part and the center portion in the sheet thickness direction of the steel sheet are more significant, when the difference in hardness exceeds Hv 200, in particular.

As described above, even if the average hardness in the sheet thickness direction is kept more than a certain level, in the case where the difference in hardness between the surface part and the center part in the sheet thickness direction of the steel sheet is more than a certain level, it cannot be easily concluded that a desired value in accordance with the average hardness can be obtained for the tensile strength of the steel sheet, however, by making the shape of the hardening pattern in the sheet thickness direction as flat as possible, more specifically, by restricting the difference in hardness between the surface part and the center part in the sheet thickness direction of the steel sheet to approximately Hv 200 or less, it is possible to avoid dramatic decreases of the tensile strength and elongation and increase the strength more stably.

As described above, in order to obtain the tensile strength of the steel sheet approximately 1,000 MPa or more for the purpose of achieving a large economical effect by increasing the strength of the steel sheet itself, it is required to make the average hardness in the sheet thickness direction approximately Hv 300 or more and the difference in hardness between the surface part and the center part in the sheet thickness direction of the steel sheet Hv 200 or less.

In this case, as the steel material before nitriding treatment, those having a tensile strength of 500 MPa or less are used from the view point of keeping the formability in plastic forming such as press forming performed before the nitriding treatment.

As described above, by making the tensile strength of the steel material 500 MPa or less, it is possible to sufficiently ensure the plastic formability such as press forming before nitriding treatment. Furthermore, by making the average hardness in the sheet thickness direction of the steel sheet member after nitriding treatment Hv 300 or more, it is possible to make the tensile strength of that steel sheet member about 1,000 MPa or more, so that significantly large economical effect can be obtained. For example, when it is applied to a panel member or structural member of a body of an automobile, not only the sheet thickness can be made thinner, but also the necessity of reinforcing members can be eliminated, with the result that not only reduction of body weight and reduction of material cost can be achieved, but also the necessity of mold costs and assembly processes are eliminated, which significantly increases the economical effect.

Furthermore, even for the same average hardness in the sheet thickness direction, the larger the difference in hardness between the surface part and the center part in the sheet thickness direction of the steel sheet, the lower the tensile strength and elongation property become, however, by setting the difference in hardness between the surface part and the inside center part in the sheet thickness direction of the steel sheet of the above formed member to Hv 200 or less, it is possible to avoid dramatic decreases of the tensile strength and elongation and achieve more stable strengthening of the steel sheet.

While the above explanation was made on a steel sheet material (sheet-like steel material), not only such a sheet-like material, but also a pipe-like steel material having a predetermined wall thickness, for example, can achieve the same effect as the above-described steel material by making the tensile strength of the steel material 500 MPa or less, making the average hardness in the thickness direction of the steel member after nitriding treatment Hv 300 or more, and making the difference in hardness between the surface part and the center part in the thickness direction of the steel member after nitriding treatment Hv 200 or less.

Next, various concrete examples of steel member (formed member) produced by subjecting the steel materials as described above to nitriding treatment will be explained. In the following explanations of the respective concrete examples, description will not be repeated for avoiding duplication, however, at least a steel material used for a member or part for performing nitriding treatment contains the five steel basic elements (C, Si, Mn, P and S) in a range defined in Table 1 above, further contains a predetermined amount (See Table 1) of at least one of titanium (Ti), niobium (Nb), boron (B), vanadium (V) and aluminum (Al) as a nitriding element as described above, and has a tensile strength of 500 MPa or less as described above. Further, the condition of nitriding treatment is so controlled that the average hardness in the steel thickness direction of the steel member after nitriding treatment is Hv 300 or more, and the difference in hardness between the surface part and the inside center part in the sheet thickness direction of the steel member after nitriding treatment is Hv 200 or less.

First, one concrete example of a formed member of a steel member and its production method will be explained by taking the case where it is applied to a reinforcing member of a body pillar of an automobile as an example.

Figure 9A:
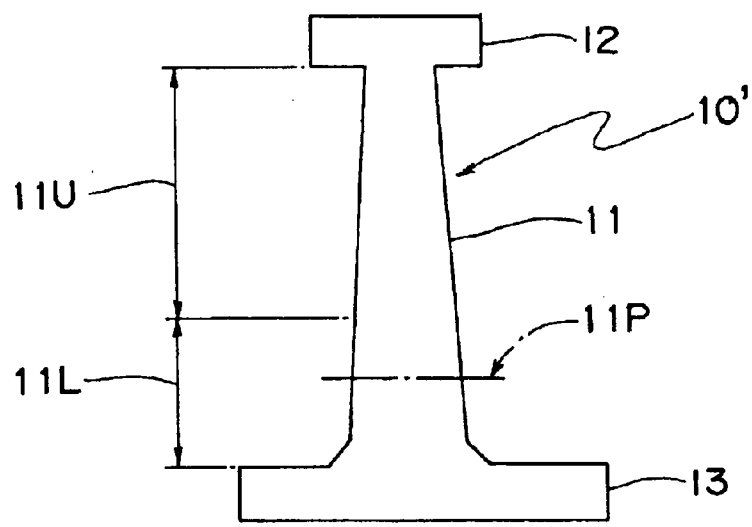
FIG. 9A is a front explanatory view schematically showing a center pillar reinforcement before heat treatment as a concrete example of a formed member.
Figure 9B:
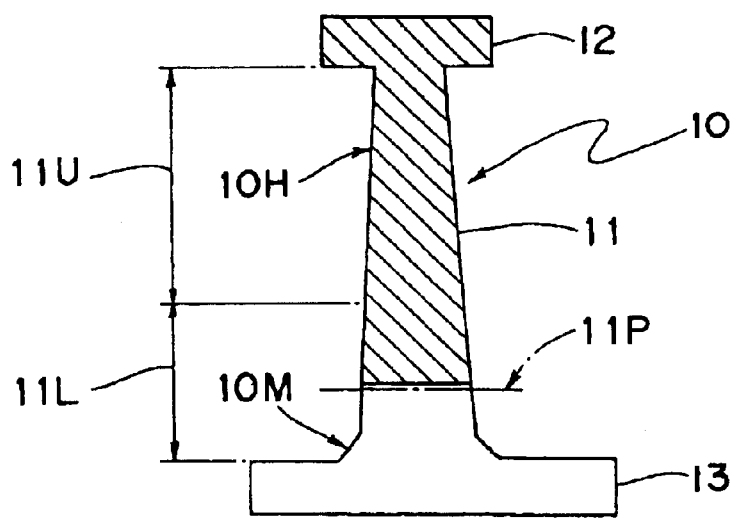
FIG. 9B is a front explanatory view schematically showing the center pillar reinforcement after heat treatment as the concrete example of the formed member.

FIGS. 9A and 9B are front explanatory view schematically showing conditions before and after the nitriding treatment of a reinforcing member of a steel sheet to be incorporated into the interior of a center pillar vertically extending approximately in the inside center part of the body of an automobile (center pillar reinforcement: hereinafter abbreviated appropriately as "center pillar-rein").

As shown in these figures, a center pillar-rein 10 (See FIG. 9B) is consists of a main body portion 11 extending in the vertical direction (rein-body), an upper end base portion 12 in the front-and-rear direction which is provided on the upper end of the rein-body 11 and to be incorporated into a roof rail (not shown) located on the side of the roof of the body, and a lower end base portion 13 in the front-and-rear direction which is provided on the lower end of the rein-body 11 and to be incorporated into a side sill (not shown) located on the floor side of the body, all of these portions 11, 12 and 13 being integrally formed by press forming of a single nitriding sheet.

As is well known in the art, the center pillar (not shown) into which the center pillar-rein 10 is to be incorporated as a main reinforcing member can perform, when the vehicle receives a collision, the function of protecting passengers by dispersing the collision energy. By desirably controlling the deformation mode of bending deformation at the time of side collision, it is possible to further improve the safety of passengers.

To be more specific, the rein-body 11 of the center pillar-rein 10 is composed of a belt line portion 11U on the upper part and a hinge portion 11L on the lower part as the part corresponding to the interior passenger sheet being a boundary, and it is desired that the belt line portion 11U corresponding to the interior passenger position is prevented from entering into the interior as much as possible when the center pillar bends at the time of side collision. In other words, it is preferred that the hinge portion 11L located under the belt line portion 11U deforms precedently to the belt line portion 11U.

Therefore, it is preferred that the rein-body 11 of the center pillar-rein 10 will bend in such a manner that in the case where a directly underside portion 11P of the belt line portion 11U is made to easily bend and then a side collision load is applied, this directly underside portion 11P of belt line precedently bends and the hinge portion 11L precedently deforms as this directly underside portion 11P being an origin. By setting the deformation mode at the time of bending in this way, it is possible to prevent the belt line portion 11U from entering into the interior and further improve the safety of passengers.

In view of the above, in the present concrete example, a part of a center pillar-rein formed member 10' (See FIG. 9A) representing the state before nitriding treatment of the center pillar rein 10 is subjected to a nitriding treatment partially, and a boundary between a highly strengthening region 10H including the belt line portion 11U for which increasing of strength is desired and an non-strengthening region 10M including the hinge portion 11L which is desired to precedently bend to the belt line portion 11U is defined as the aforementioned directly underside portion 11P of belt line.

By setting as described above, a difference in strength between the strengthened region 10H and the unstrengthened region 10M occurs in the boundary portion 11p, so that the center pillar-rein 11 becomes easy to bend at this boundary portion 11P. Furthermore, while the belt line portion 11U located upward from the belt line directly underside portion 11p and corresponding to the strengthened region 10H becomes unlikely to deform because the strength thereof is increased by a nitriding treatment, while the hinge portion 11L located downward from the belt line directly underside portion 11P and corresponding to the unstrengthened region 10M becomes relatively easy to deform because the strength thereof is not increased (that is, it deforms precedently to the belt line portion 11U).

Such partial (selective) nitriding treatment can be achieved only by effecting a masking treatment on the non-strengthening region 10M prior to nitriding treatment. This masking treatment can be achieved, for example, by covering the non-strengthening region 10M with a suitable covering material (including films such as plating films, for example.) When the masking treatment is performed, any of the gas nitriding method and salt bath nitriding method can be applied.

As described above, by effecting a masking treatment on the part of the formed member 10 (unspecific region 10M) other than the specific region 10H before nitriding treatment, it is possible to increase the strength of only the specific region 10H of the formed member 10 by nitriding treatment accurately and easily.

In the case where such a masking treatment is not performed, the salt bath method is applied, in which only the strengthening region 10H is immersed in the salt bath and the non-strengthening region 10M is held outside the salt bath.

In this way, in the case where the nitriding treatment is performed while only the specific region 10H of the formed member 10 being immersed in the salt bath, it is possible to securely increase the strength of only the specific region 10H of the formed member 10 without necessity of providing another process (masking process).

As described above, only the specific region (strengthening region 10H) of the formed member (center pillar-rein 10) is strengthened by nitriding treatment, so that when the formed member deforms in a bending manner, it deforms from the boundary portion 11P between the specific region 10H and the unspecific region (unstrengthened region 10M) as its origin of bending, with the result that it is possible to desirably control the deformation mode at the time of bent-deformation for the one-piece formed member 10 without necessity of providing another member such as for example, joint member or partial reinforcing member and the like.

Next, another concrete example of the formed member of a steel sheet member will be explained while taking a front frame which is a body frame of an automobile as an example.

Figure 10:
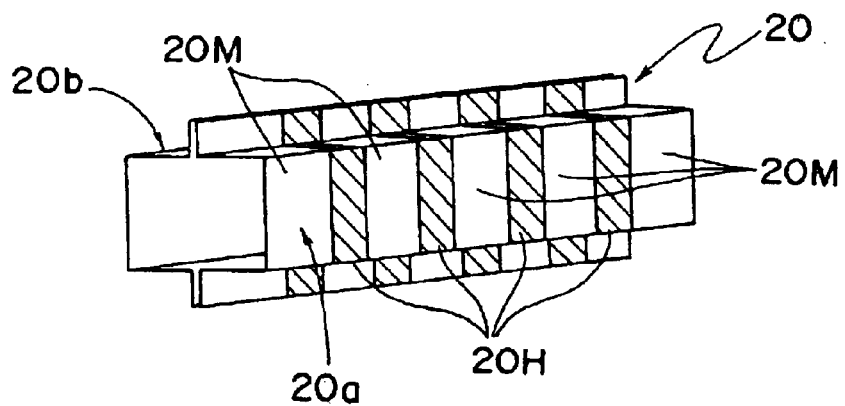
FIG. 10 is a perspective view schematically showing a front frame as another concrete example of the formed member.

FIG. 10 is a perspective view schematically showing a front frame extending in the front-and-rear direction in the left and right side parts of the front portion of an automobile. As shown in this figure, a front frame 20 is formed by joining a pair of two steel sheet members 20a, 20b so that openings of their cross sections are opposed to each other, the steel sheet members 20a, 20b being press-formed so as to have a hat like cross section shape (such a shape that a flange-like portions outwardly extending is integrated to each end of the U-like cross section).

As is well known, the front frame 20 can perform the function of protecting passengers when the vehicle experiences a front collision, by absorbing the collision energy, however, in this case, the frame 20 itself buckles to thereby absorb the collision energy in the course of buckling. Then, in the case energy absorption is achieved by buckling of the frame itself, by allowing the frame 20 to deform by buckling so that it is folded as much as possible, it is possible to achieve more efficient energy absorption.

In view of the above, in the present concrete example, after forming a front frame formed member using a nitriding steel sheet as a material, a partial (selective) nitriding treatment is performed so that a plurality of strengthened regions 20H adjusted to have a predetermined width align in the longitudinal direction of the frame 20 with unstrengthened regions 20M interposed therebetween as shown in FIG. 10.

Alternatively, in place of effecting a partial nitriding treatment after forming a front frame formed member from press-formed nitriding steel sheets, it is also possible to effect a partial nitriding treatment on each press-formed member after press-forming of nitriding steel sheets, and thereafter to join these members to complete the front frame.

By conducting such a partial nitriding treatment, in the front frame 20, the strengthened portions 20H (strengthened regions) align in the longitudinal direction with an unstrengthened portions 20M (unstrengthened region) interposed therebetween so that regions with different strengths appear periodically (every predetermined width) in a repeated manner, with the result that when a collision load is applied in the longitudinal direction, the frame 20 is easy to deform by bending so as to be folded, and hence it is possible to improve the amount of energy absorption with high efficiency.

Such a partial nitriding treatment can be achieved by effecting a masking treatment on the non treated regions 20M before nitriding treatment. This masking treatment can be achieved, for example, by covering the non treated region 20M with a suitable covering material (including films such as plating films, for example). When the masking treatment is performed, any of the gas nitriding method and salt bath nitriding method can be applied.

As the method for forming a part having a different strength from other parts in a one-piece formed member, there is a method using a member formed by a so-called tailored blank method.

Next, another concrete example of the formed member made of a steel sheet member will be explained with reference to FIGS. 11A and 11B. Similar to that shown in FIG. 10, a front frame 30 according to the present concrete example (See FIG. 11B) is formed by joining a pair of two steel sheet members 30a, 30b so that openings of their cross sections are opposed to each other, the steel sheet members 30a, 30b being press-formed so as to have a hat like cross section shape.

Figure 11A:
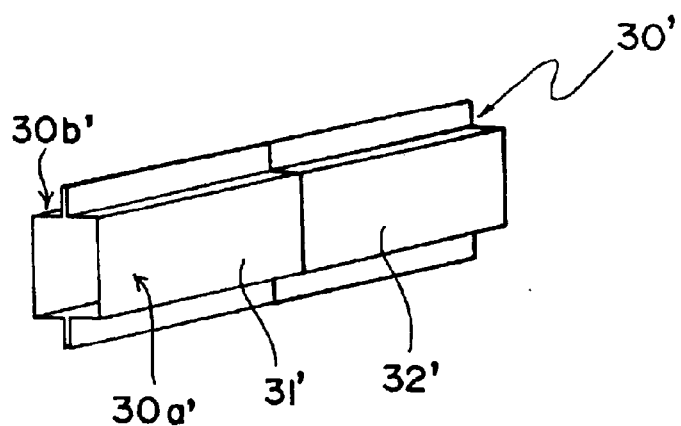
FIG. 11A is a perspective view schematically showing a front frame before heat treatment as yet another concrete example of the formed member.
Figure 11B:
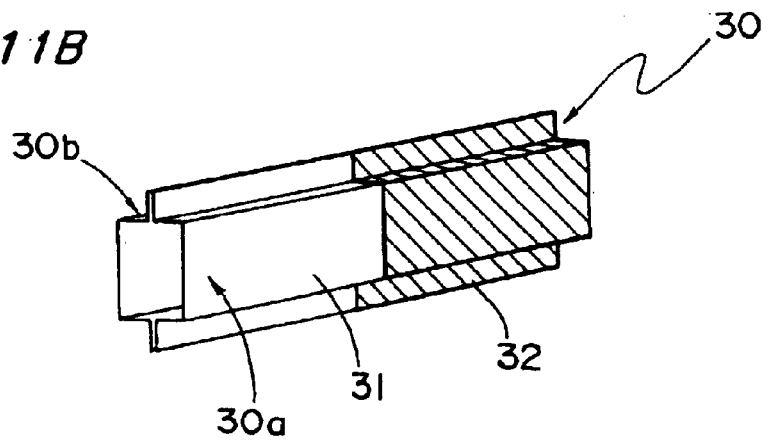
FIG. 11B is a perspective view schematically showing the front frame after heat treatment as yet another concrete example of the formed member.

This front frame 30 is obtained by subjecting a front frame formed member 30' shown in FIG. 11A to a predetermined hardening heat treatment (e.g., nitriding treatment in the present concrete example), and the front frame formed member 30' consists of a first press formed part 31' not to be strengthened by nitriding treatment and a second press formed part 32' capable of being strengthened by nitriding treatment.

That is, the front frame formed member 30' is formed by a so-called tailored blank method. Though not specifically shown in the drawings, in the above method, for example, a first blank material (steel sheet material) made of a steel sheet material which does not contain a nitriding element and thus can not be strengthened by nitriding treatment, and a second blank material which contains a nitriding element and thus can be strengthened by nitriding treatment are joined by welding to form a preform, and then a single sheet material (preform) thus obtained is press formed to prepare a steel sheet member 30a' having a hat-like cross section shape. Also a steel sheet member 30b' to be combined with this is prepared in the same manner, and these two members 30a' and 30b' are joined with each other by welding to form the front frame formed member 30' having the first press formed part 31' and the second press formed part 32'.

It is to be noted that, the first press formed part 31' may be formed using, for example, a steel sheet not containing a nitriding element as described above, as a material (first blank material), or may be formed using a steel sheet having a certain specification (e.g., sheet thickness) that is different from that of the second blank material though it is a nitriding steel sheet containing a nitriding element in respect of the material (first blank material) as a material. On the other hand, the second press formed part 32' forms a formed member part which is formed by using a nitriding steel sheet as a material (second blank material) and to be strengthened by nitriding treatment.

In this case, such partial nitriding treatment can be-achieved only by effecting a masking treatment on the first press formed part 31' prior to nitriding treatment. This masking treatment can be achieved, for example, by covering the first press formed part 31' with a suitable covering material (including films such as plating films, for example). When the masking treatment is performed, any of the gas nitriding method and salt bath nitriding method can be applied. In the case where such a masking treatment is not performed, the salt bath method is applied, in which only the second press formed part 32' to be strengthened is immersed in the salt bath and the first press formed part 31' not to be strengthened is held outside the salt bath.

In the case of effecting a masking treatment on the first press formed part 31', it is preferred to perform the masking treatment by plating. This is because in the case of members which are to be used in lower part of the body of an automobile, though there is a strict requirement for the corrosion resistance, the corrosion resistance is not sufficient only by the nitriding treatment, and by covering the first press formed part 31' with a plating film, it is possible to improve the corrosion resistance.

As described above, by subjecting the front frame formed member 30' consisting of the first press formed part 31' and the second press formed part 32' to a nitriding treatment, it is possible to obtain the front frame 30 consisting of the region which is not strengthened (unstrengthened region) 31 and the region which is strengthened (strengthened region) 32.

In such front frame 30, since the strength largely differs at the boundary between the unstrengthened region 31 and the strengthened region 32, it is likely to bend from this boundary as an origin, while buckling which will cause folding occurs in the unstrengthened region 31 which is not strengthened, so that it is possible to absorb the collision energy with high efficiency.

In the case where a part having a strength different from that of other parts is formed in a one-piece member by using a member formed by the tailored blank method as described above, in general, since steel sheet materials (blank materials) having different mechanical properties are joined together to be press formed, a difference in press formability (in other words, elongation property of material) occurs between these blank materials, which may result in an occurrence of defects such as crack or break at the jointed portion.

In view of the above, in the present concrete example, steel sheet materials having nearly the same elongation property are prepared as blank materials, these materials are integrated into a formed member by the tailored blank method, and this formed member is subjected to a nitriding treatment, whereby a one-piece member having therein a part with a strength which is different from that of other parts is obtained.

Specifications such as steel type and chemical composition of each blank material used in the present concrete example are shown in Table 3. As for the blank material 1, the content of titanium (Ti) which is a kind of nitriding elements is specified to not more than 0.05 wt %, so that even if a nitriding treatment is performed, it cannot be expected to strengthen the material with significant stability. On the other hand, as for the blank material 2, the content of Ti is defined to 0.05 wt % or more, so that sufficiently stable strengthening by nitriding treatment can be expected.

TABLE 3

(Unit: wt %)

| | Material and Sheet thickness | C | Si | Mn | P | S | Ti |
|---|---|---|---|---|---|---|---|
| Blank material 1 | JFS JSC270F 1.2t | 0.002 | 0.01 | 0.11 | 0.013 | 0.004 | 0.05 or less |

TABLE 3-continued (Unit: wt %)

| | Material and Sheet thickness | C | Si | Mn | P | S | Ti |
|---|---|---|---|---|---|---|---|
| Blank material 2 | JFS JSC260G 1.4t | 0.001 | 0.004 | 0.1 | 0.007 | 0.004 | 0.05 or more |

Furthermore, the mechanical properties (tensile strength and elongation property) in the material state (before nitriding treatment) of each of the blank material 1 and 2 were as shown in the left column of Table 4. Comparing the elongation property of each material before nitriding treatment, they are 50% and 55% each and thus the difference is as little as 5%, so that it can be concluded that the elongations are nearly equal.

TABLE 4

| | Before nitriding treatment | | After nitriding treatment | |
|---|---|---|---|---|
| | Tensile strength (MPa) | Elongation (%) | Tensile strength (MPa) | Elongation (%) |
| Blank material 1 | 289 | 50 | 466 | 25 |
| Blank material 2 | 267 | 55 | 651 | 23 |

Using the blank materials as described above and applying the tailored blank method, for example, a member having therein a part of which strength is different from that of other parts was prepared in the same manner as the front frame 30 shown in FIG. 11.

That is, first, a first blank material made of the blank material 1 and a second blank material made of the blank material 2 were joined by, e.g., laser welding, and a single sheet material thus obtained (preform) was, for example, press formed to obtain a formed member having a predetermined shape. At this time, malfunctions such as crack and break did not occur at the joining part of both blank materials.

Then this formed member was subjected, for example, to a gas carbo-nitriding treatment. To be more specific, the carbo-nitriding treatment of retaining the formed member for 6 hours in an atmosphere of mixed gas (NH$_3$:RX=1:1) of NH$_3$ gas and RX gas (endoergic) maintained at the treating temperature of 570° C. was performed. Also for this heating treatment, malfunctions such as crack and break did not occur at the joining part of the first and second blank materials.

As a result of this, a final member consisting of a region (first blank material region) which is made of the first blank material and not strengthened by nitriding treatment and a region (second blank material region) which is made of the second blank material and strengthened by nitriding treatment was obtained. Mechanical properties after nitriding treatment of the first blank material region (blank material 1) and the second blank material region (blank material 2) of the final member were as shown in the right column of Table 4.

Figure 12:
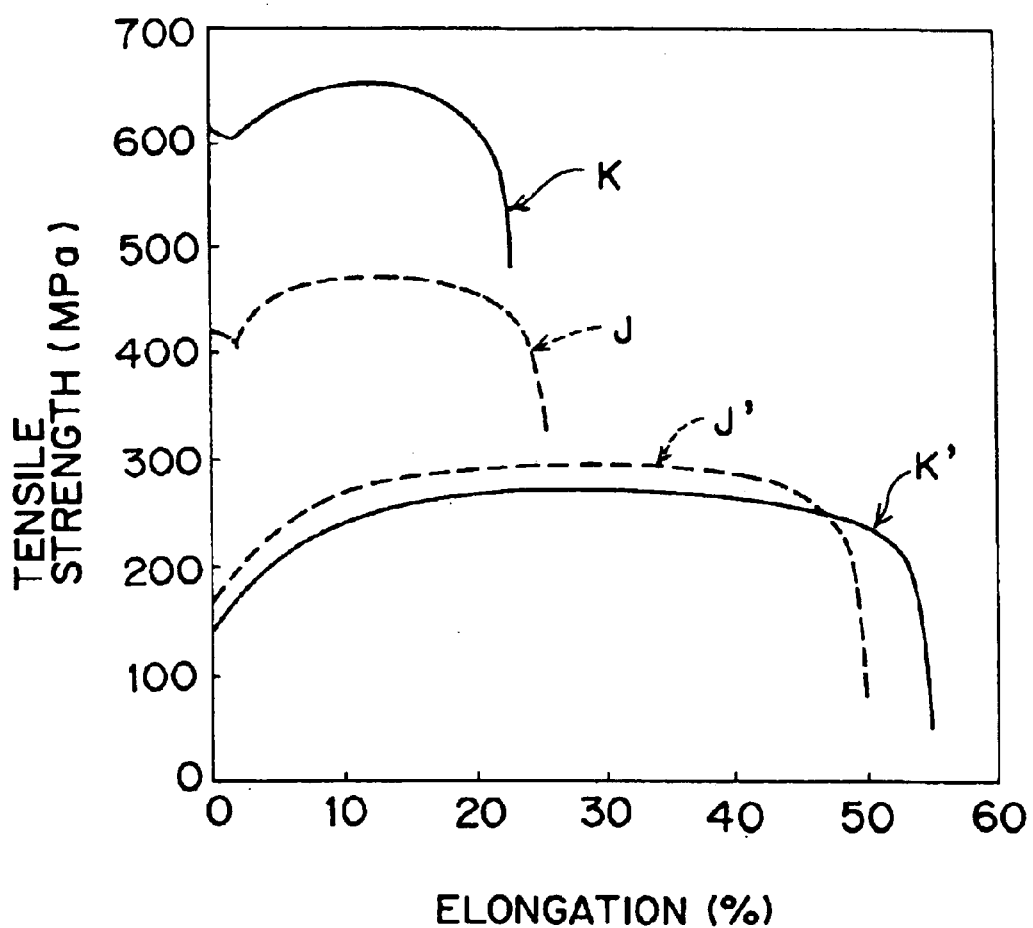
FIG. 12 is a graph showing a relationship of tensile strength with respect to elongation before and after nitriding treatment of each blank material used in the front frame according to the above yet another concrete example.

Furthermore, as for the blank material 1 and the blank material 2, relationships of tensile strength with respect to elongation before and after nitriding treatment were shown in the graph of FIG. 12. In this graph of FIG. 12, the rigid curves K' and K represent the properties before and after nitriding treatment of the second blank material respectively and the broken curves J' and J represent the properties before and after nitriding treatment of the first blank material respectively.

As clearly seen from FIG. 12 and Table 4 above, the blank material 2 (second blank material region) exhibited a larger range of increase in tensile strength due to nitriding treatment than the blank material 1 (first blank material region), and a formed member having a part with sufficient difference in strength from other parts was obtained.

Furthermore, the tensile strength of the second blank region is increased to 651 MPa as a result of nitriding treatment. This value is a tensile strength value to which the tailored blank method could hardly be applied heretofore. That is, according to the method of the present invention, it was possible to obtain, by the tailored blank method, a formed member of a steel sheet material having such a high strength to which the tailored blank method could hardly be applied heretofore.

As described above, since after press forming the preform which has been formed by joining sheet-like members (first blank material and second blank material) having different properties for a predetermined specification, a specific part of the formed member obtained by this press forming is hardened by heat treatment (nitriding treatment), it is possible to sufficiently ensure the press formability before heat treatment. And by heat treatment performed after press forming provides the specific part of the formed member with a desired strength.

That is, by applying the tailored blank method, it is possible to obtain a formed member having a part therein of which strength is sufficiently higher than other parts, while improving yield of the sheet-like material.

In such a case, particularly, since the difference in elongation property before press forming between the first blank material and the second blank material is set within a predetermined range, it is possible to avoid occurrence of malfunctions such as crack and break in the press forming performed after joining these materials.

Next, the case where the tailored blank method as described above is applied to the body of an automobile will be explained.

Figure 13:
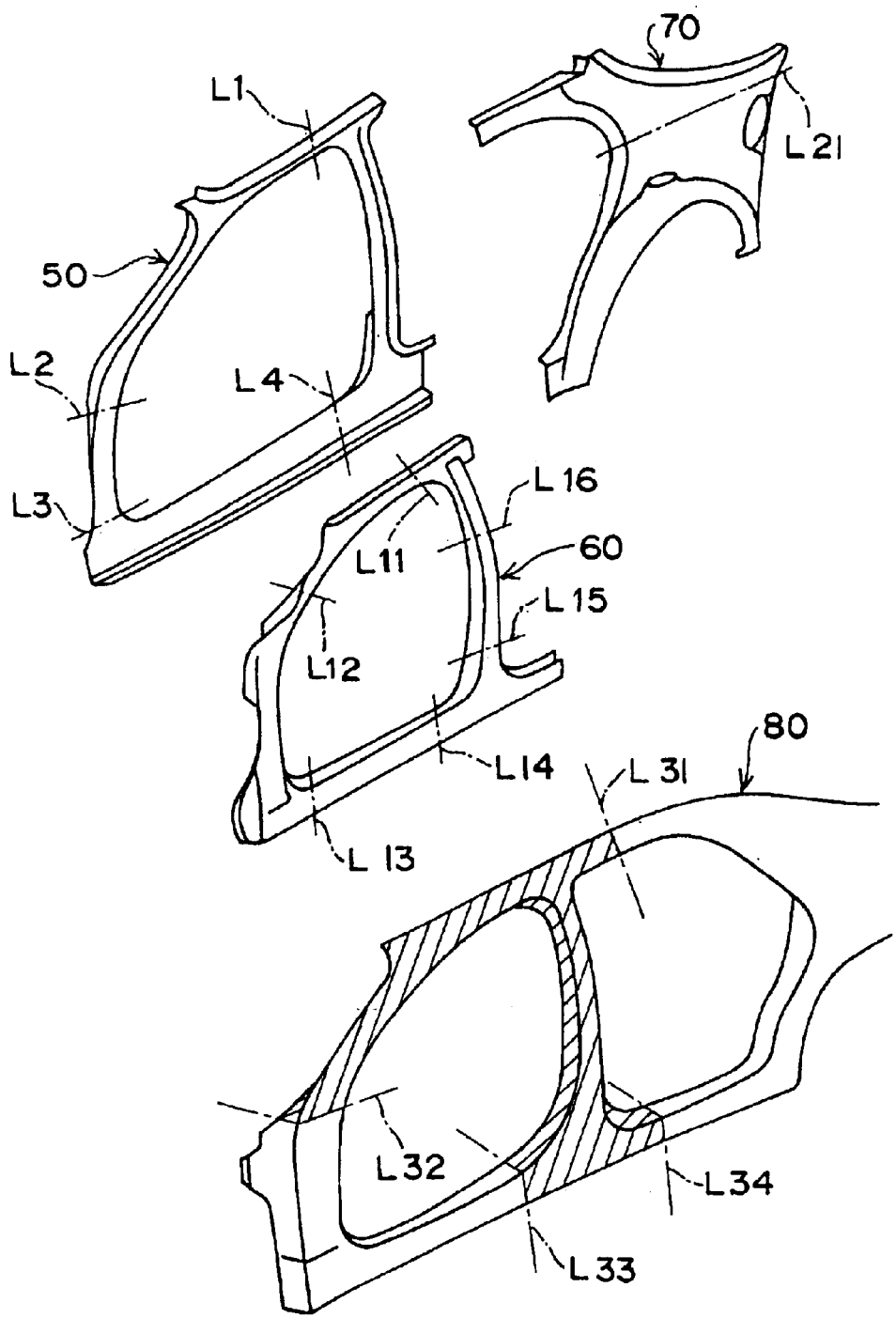
FIG. 13 is an exploded perspective view showing an example where tailored blank method is applied to a cab-side assembly of an automobile.

FIG. 13 is an exploded perspective view showing a structure of a panel assembly (cab-side assembly) constituting mainly the side part (cab-side) of the cabin of the body of an automobile. According to this concrete example, the tailored blank method as described above is applied to each of a cab-side inner panel 50 (inner panel of the side part of the cabin), a cab-side reinforcement 60 (reinforcing member of the side part of the cabin), a rear pillar inner panel 70 (inner panel of the rear portion of the side part of the cabin), and a cab-side outer panel 80 (outer panel of the side part of the body), and then the respective parts are finally integrated.

For example, the cab-side inner panel 50, the cab-side reinforcement 60, the rear pillar inner panel and the cab-side outer panel 80 are divided at dividing lines L1–L4, dividing lines L11–L16, a dividing line L21 and dividing lines L31–L34, respectively.

Then for each region partitioned by these dividing lines, optimum material for the steel sheet material, sheet thickness, heat treatment, surface treatment and the like are set in consideration of properties to be possessed (for example, strength, rigidity, corrosion resistance and the like) and the effects of reducing the body weight and reducing the production cost.

For example, in the case of the rear pillar inner panel 70, the sheet thickness is uniform, and a steel sheet experienced a plating treatment is used for the lower part of the dividing line L21 for the purpose of improving the corrosion resistance, while the upper part of the dividing line L21 does not experience a specific surface treatment. Further, in the case of the cab-side outer panel 80, as for the area surrounded by each of the dividing lines L31–L34 to which diagonal hatching is made, it is preferable that the sheet thickness is set thicker than that of other parts by using the tailored blank method.

When considering reduction of body weight by strengthening the steel sheet itself (that is, due to reduction of thickness of the steel sheet material), as described above, in general, it is not preferred to select such body parts and structural members that requires ensuring of not only the strength but also the rigidity from the view point of the body structure (in other words, attribution with respect to the rigidity of the whole body is high) as a subject to be made thinner for reducing the weight, because even if the strength is ensured by strengthening the steel sheet itself, the reduced sheet thickness adversely affects from the view point of ensuring the rigidity. However, it is preferred to consider of applying this measurement to such body parts and structural members in which attribution with respect to the rigidity of the whole body is relatively low, and requires to keep a certain strength or higher.

Figure 14:
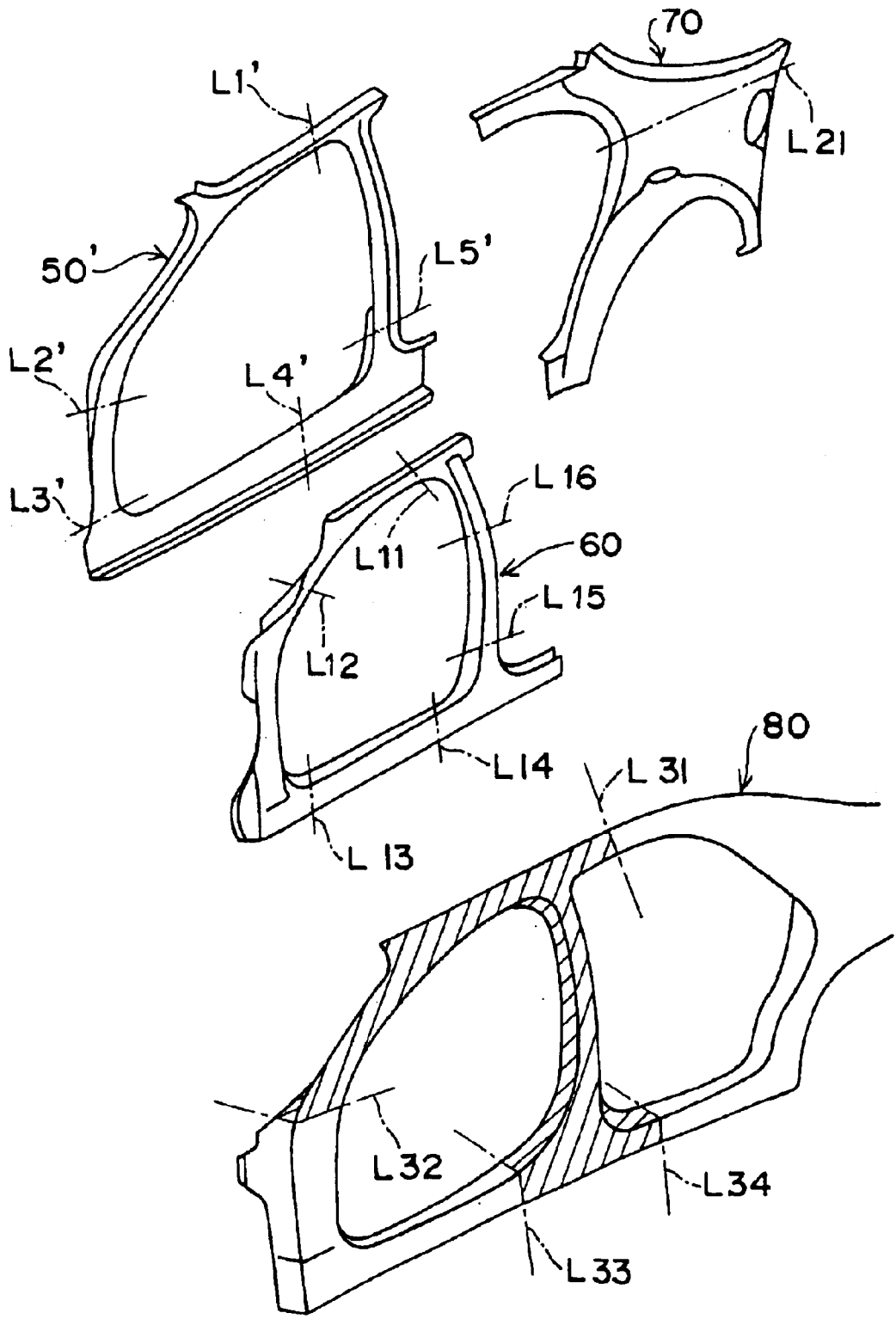
FIG. 14 is an exploded perspective view showing another example where tailored blank method is applied to a cab-side assembly of an automobile.

FIG. 14 is an exploded perspective view showing another example in which the tailored blank method is applied to a cab-side assembly of an automobile. In this concrete example, the cab-side reinforcement 60, the rear pillar inner panel 70 and the cab-side outer panel 80 are the same as those of the example shown in FIG. 13, while as for a cab-side inner panel 50' which are divided at five dividing lines L1'–L5', the way of division is different from that of the example shown in FIG. 13.

As described above, by applying the tailored blank method for production of the body of an automobile, it is possible to set the optimum material for the steel sheet material, sheet thickness, heat treatment property, surface treatment and the like in consideration of properties to be possessed (for example, strength, rigidity, corrosion resistance and the like) and the effects of reducing the body weight and reducing the production cost.

Next, a concrete example in which a formed member made of a steel sheet member is reinforced by a foam located inside the same will be explained.

Figure 15:
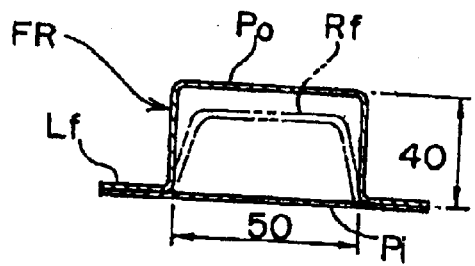
FIG. 15 is an explanatory view showing a section structure before setting a foam material in a body frame to be reinforced by a foam.

FIG. 15 shows a cross sectional structure of a body frame member for an automobile as a formed member according to the present concrete example. As a panel material for forming the frame, a JSH270C steel sheet standardized by Japan Iron and Steel Federation (See Table 2: Specimen a) containing a predetermined amount of at least one element from the above mentioned nitriding elements was used. Further, the sheet thickness of this material was about 1 mm.

Using this steel sheet, as shown in FIG. 15, a panel material Po (outer panel) press formed into a U sectional shape opening at one side, and a flat panel material Pi (inner panel) are combined to be a semi-hat shape, and spot welding at a pitch of 60 mm was performed on an overlapping portion Lf thereof to thereby complete the assembly.

As shown by the imaginary line of FIG. 15, in the case where a reinforcement Rf was located inside the frame section, the material of this reinforcement Rf was as same as that of the panel materials Pi, Po of the frame FR. In this case, a flange portions (not shown) at either end of the reinforcement Rf is sandwiched between the flanges (overlapping portion Lf) of the panel materials Pi, Po, and then these three sheets are assembled by spot welding.

As the foam material to be filled in the closed section of the frame Fr, the following are preferred. Furthermore, the density of each of these foam materials was determined. This density of foam material was determined for each material at the room temperature (about 20° C.).

Foam urethane resin (hardness [8 kg/cm$^2$]): density 0.09 [g/cm$^3$]

Epoxy resin A: density 0.50 [g/cm$^3$]

Epoxy resin B: density 0.50 [g/cm$^3$]

Now, assuming the case of reinforcing by using the above-mentioned reinforcement Rf made of a steel sheet, it is possible to calculate the inside frame converted density from the weight of the reinforcement Rf located inside the frame section as shown in FIG. 15, and the volume of the frame FR corresponding to the located part of the reinforcement Rf, and in the case of the present concrete example, the inside frame converted density of this reinforcement Rf was 0.61 [g/cm$^3$].

Therefore, from the view point of weight reduction of the frame member FR, it is preferable that the density of the foam material to be filled therein is 0.60 [g/cm$^3$] or less.

In the present concrete example, in fabricating the frame Fr, at least a panel material (for example, flat inner panel material Pi) to which a foam material in the unexpanded state is to be set is subjected to a nitriding treatment in advance.

As a result of this nitriding treatment, since a nitride having a porous surface is generated on the surface and the vicinity of the inner panel Pi, the surface state of the area to which the foam material is to be set is microscopically porous.

Figure 16:
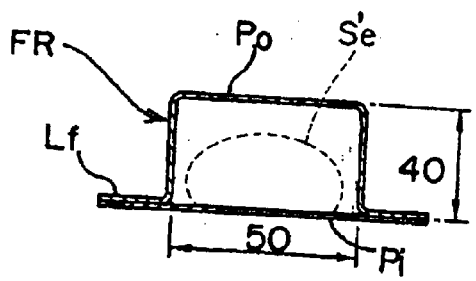
FIG. 16 is an explanatory view showing a section structure in a state that the foam material is set in the body frame to be reinforced by the foam.
Figure 17:
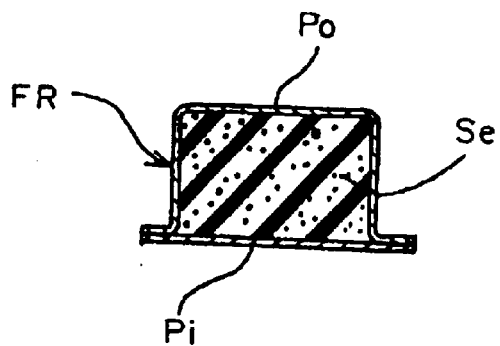
FIG. 17 is an explanatory view showing a section structure after the foam material has expanded in the body frame to be reinforced by the foam.

Then, after setting a foam material Se' (for example, epoxy resin) in the unexpanded state on the inner panel Pi of which surface and vicinity is porous as shown in FIG. 16, the frame body FR is heated to a temperature in the range of 150 to 200° C. As the result of this, as shown in FIG. 17, the epoxy resin Se foams and expands, and hardened after filling perfectly the whole of the closed section of the frame body FR. At this time, the epoxy resin adheres to the inner surface of the panel due to its own adhesion force. It is to be noted that heating in this expansion process may be achieved by utilizing the heat in the drying process for drying the frame FR after painting thereon.

In this way, the foam material is foamed and hardened with respect to the predetermined region (inner panel Pi) where the surface and the vicinity are porous as a result of the heat treatment, resulting that a significantly higher adhesion force can be obtained compared to the case for the steel sheet to which heat treatment is not performed. That is, in reinforcing the formed member by filling a foam, it is possible to allow the foam to be fixed onto the formed member with a relatively simple configuration, and to obtain higher reinforcing effect by filling the foam.

In the case of filling the frame section with the filling material, by increasing the adhesion force between at least a part of the panel material constituting the frame and the filling material, it is possible to significantly improve the maximum bending moment that the frame can bear, and the energy absorbing amount.

Figure 18:
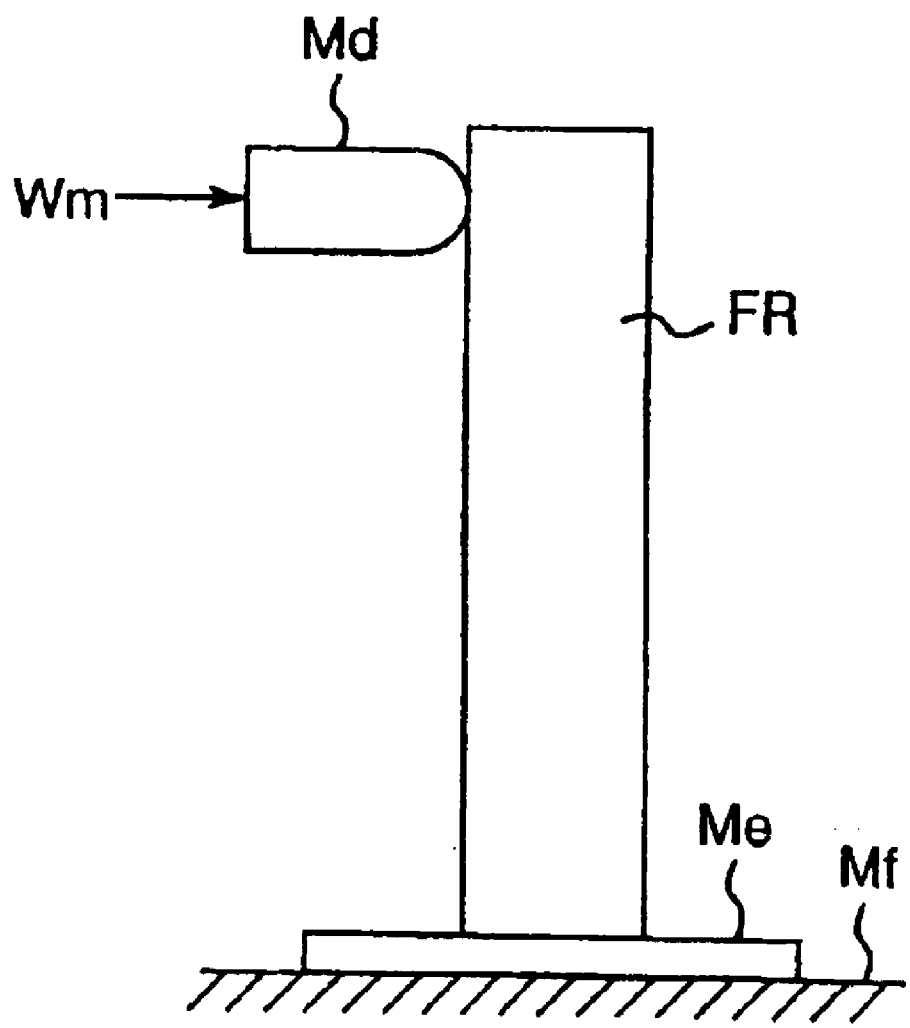
FIG. 18 is an explanatory view schematically showing a test device for performing a static cantilever bending test of a body frame.

FIG. 18 is an explanatory view schematically showing a test apparatus for performing a static cantilever bending test of the frame. After filling the section of the frame FR of a predetermined length having the section shape shown in FIG. 17 with a filling material S, one end of the frame FR is fixed to a supporting plate Me, and the supporting plate Me is fixed to a apparatus substrate Mf. Then by means of a universal testing machine, a static load Wm is applied to the vicinity of the other end of the frame FR via a loading member Md, relationships between the displacement and the bending angle, and the load are measured, and then the maximum bending moment and the static energy absorbing amount were determined.

Figure 19:
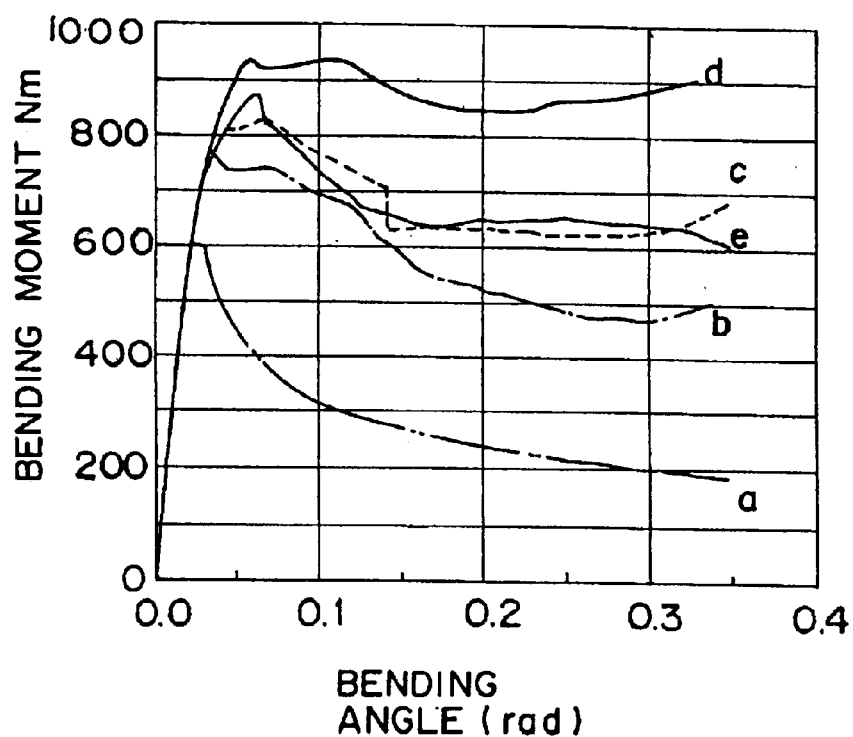
FIG. 19 is a graph showing a relationship between bending angle and bending moment of frames including various kinds of filling materials in the cantilever bending test.

FIG. 19 is a graph showing relationships between the bending angle and the bending moment of frames filled with various filling materials respectively. In this graph, the curves a–e show the characteristics of the frames using the following filling materials.

Curve a: No filling material (steel sheet only)

Curve b: Epoxy resin A

Curve c: Epoxy resin B

Curve d: Epoxy resin B with an adhesive (body sealer having a shear strength of 7.3 MPa) applied between the filling material and the panel material Po or Pi of the frame FR Curve e: Wood (pine)

As seen from the graph of FIG. 19, for any curves, the value of bending moment largely increases as the bending angle increases until the bending angle reaches to a certain degree. And, as for the curves a–c and e, they reach to the peak (maximum point) at a certain bending angle, and thereafter as the bending angle increases, the bending moment decreases. In the case of the curve a (only steel sheet frame without filling material), the degree of decrease is especially large.

To the contrary, as for the curve d (epoxy resin B plus adhesive), even after the bending moment has significantly increased, decrease of the bending moment in response to the increase of the bending angle is not observed, and the bending moment remains high. Furthermore, the maximum bending moment is the highest in the five curves. Compared to the curve c in which the same filling material (epoxy resin B) is used, significant differences are observed for both of the inclination with respect to the increase of the bending angle, and the magnitude of the maximum bending moment.

That is, it is clear from the above result that even if the same filling material is used, the bending moment property of the frame is significantly improved by fixing the filling material to the panel material of the frame by means of an adhesive.

Figure 20:
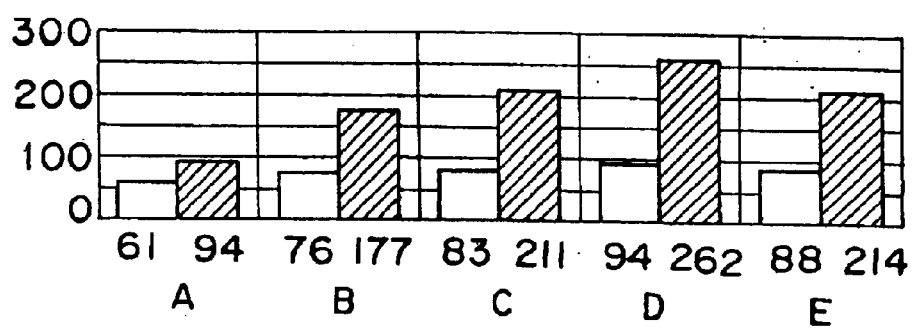
FIG. 20 is a graph showing maximum bending moment and energy absorbing amount of frames including various kinds of filling materials in the cantilever bending test.

FIG. 20 is a bar graph showing the maximum bending moment [Nm] and the energy absorbing amount [J] of the frames which are filled with various filling materials similar to those of FIG. 19. In this graph, the columns A–E respectively show the characteristics of the frames to which the following filling materials are applied. In each column, the left numeral value (hollow bar graph) represents the maximum bending moment [Nm], and the right numerical value (hatched bar graph) represents the energy absorbing amount [J] of the frame.

Column A: No filling material (steel sheet only)

Column B: Epoxy resin A

Column C: Epoxy resin B

Column D: Epoxy resin B plus adhesive (Filling material is epoxy resin B and an adhesive (body sealer having a shear strength of 7.2 MPa) is applied between the filling material and the panel material Po or Pi of the frame FR.)

Column E: Wood (pine)

As is well recognized from FIG. 20, the energy absorbing amount of the frame is the largest for the one to which the epoxy resin B plus the adhesive are applied (column D), and a distinct difference was observed compared to the energy absorbing amount of column C using the same filling material (epoxy resin B).

That is, it is clear from the above result that even if the same filling material is used, the energy absorbing property of the frame is significantly improved by fixing the filling material to the panel material of the frame by means of an adhesive.

Figure 21:
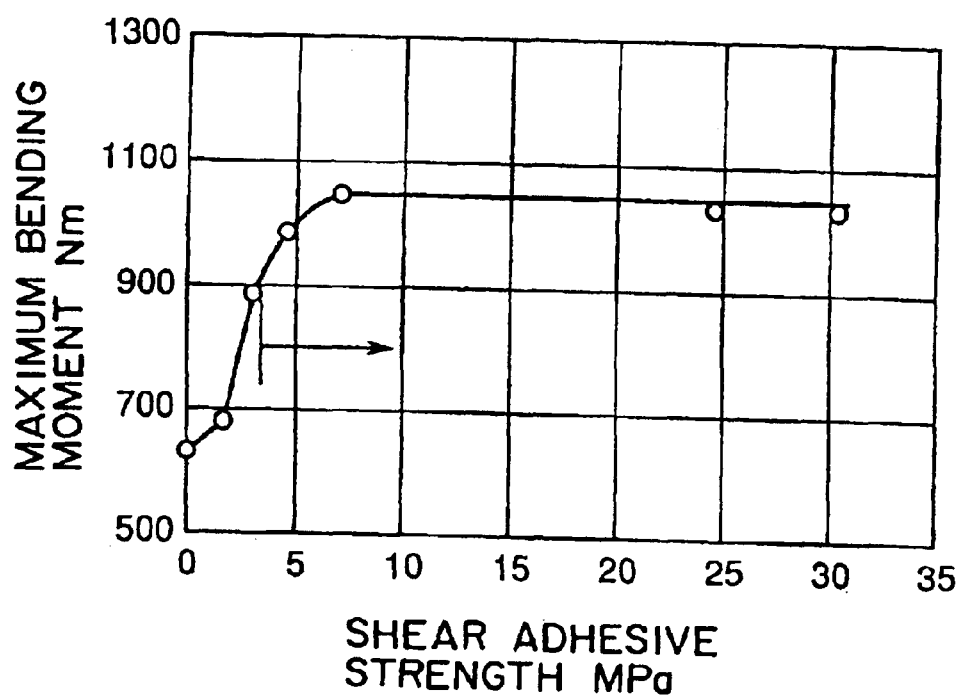
FIG. 21 is a graph showing a relationship between shear adhesive strength of adhesive layer and maximum bending moment.

FIG. 21 is a graph showing the relationship between the shear adhesive strength of an adhesive layer and the maximum bending moment.

As is clear from the graph of FIG. 21, as the shear adhesive strength of the adhesive layer increases, also the maximum bending moment increases, however, at shear adhesive strengths of 3 MPa or more, the degree of increase of the maximum bending moment (slope of the curve in the graph) becomes more moderate than before. That is, when the shear adhesive strength of the adhesive layer is 3 MPa or more, it is possible to improve the maximum bending moment that the frame can bear with extremely high efficiency, achieve a sufficient bending moment value and obtain a high energy absorbing capability. Therefore, it is essentially required that the shear adhesive strength of the adhesive is 3 MPa or more.

Furthermore, the shear adhesive strength further increases to be 7 MPa or more, the degree of increase of the maximum bending moment is saturated. In other words, when the shear adhesive strength is 7 MPa or more, it is possible to obtain a bending moment value which is close to the maximum value. Therefore, it is more preferred that the shear adhesive strength of the adhesive layer is 7 MPa or more.

In the case where the filling material itself is adhesive as is the case of the epoxy resins in the present concrete example, it is possible to allow the filling material to be directly adhered and fixed to the panel material of the frame by utilizing that adhesive capability without using another adhesive. Also in this case, the shear adhesion strength is preferably 3 MPa or more, and more preferably 7 MPa or more.

Figure 22:
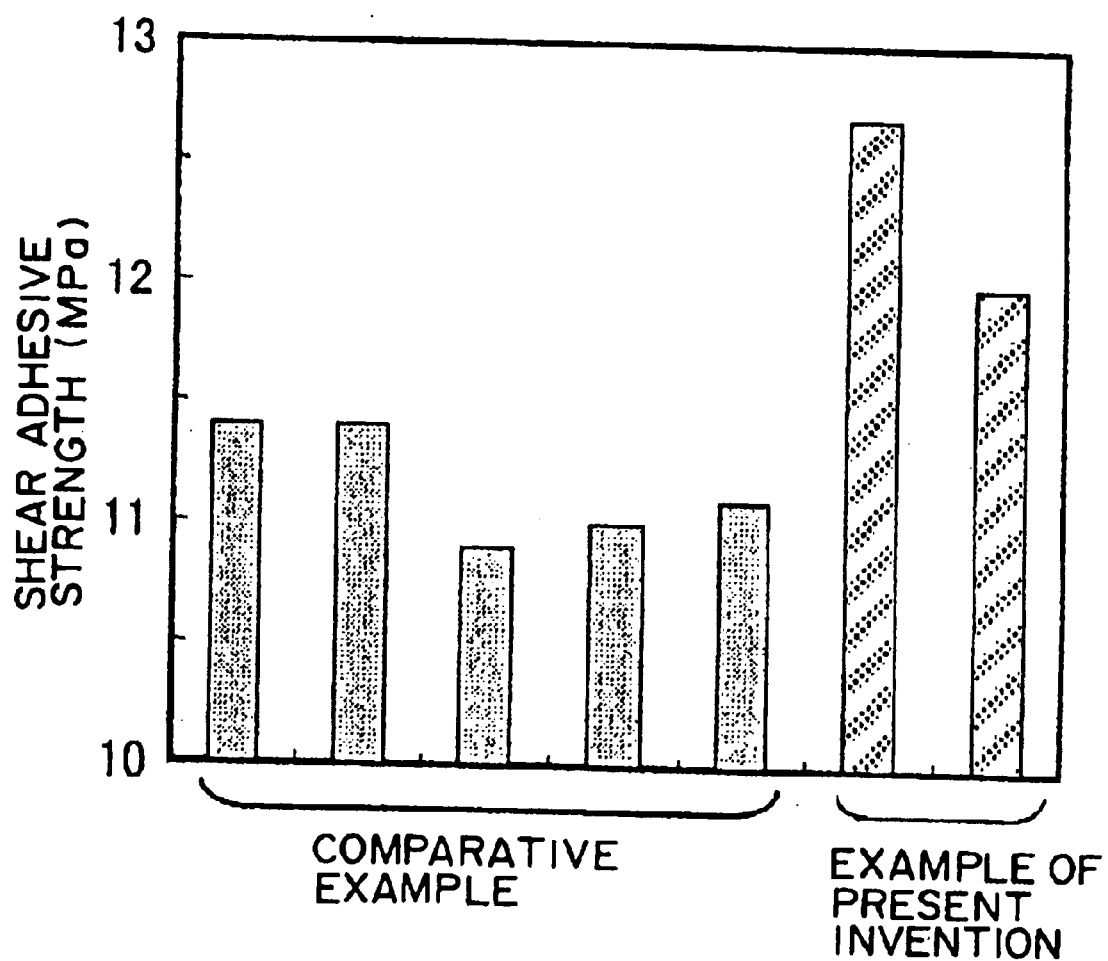
FIG. 22 is a graphs showing shear adhesive strengths of a concrete example where a specific region of a frame is subjected to a heat treatment and a comparative example where heat treatment is not performed.

FIG. 22 is a graph showing the shear adhesion strengths of the concrete example (the present example) where the inner panel Pi to which the foam material of the frame FR is to be set is subjected to a nitriding treatment as a heat treatment and a comparative example where such a treatment is not performed. Both of the steel sheet material of the inner panel Pi was the above-mentioned JSH270C steel sheet. Furthermore, this measurement of shear adhesive strength was conducted in conformance with the test method defined by JIS K 6850 "Testing Methods for Shear Strength of Adhesive Bonds by Tensile Loading".

As is apparent from this graph, it was confirmed that by subjecting the sheet material to which the foam material is to be set to a nitriding treatment, the shear adhesive strength at the bonding portion between the foam and the sheet material is significantly improved.

As described above, since after forming a formed member (frame member for a vehicle body) having a predetermined shape by subjecting a sheet material containing a predetermined heat treatment element (nitriding element) to a plastic forming, a predetermined heat treatment (nitriding treatment) is performed on at least a predetermined region of the formed member, an intermetallic compound having porosity (so-called porous) in the surface and the vicinity of the surface with respect to this predetermined region is generated. Then, since after setting a foam material to this predetermined region, the foam material is caused to expand by heating the formed member, the foam material is expanded and hardened with respect to the predetermined region of which surface and the vicinity are porous, so that it is possible to obtain much higher adhesive property than the case of the steel sheet not having experienced a heat treatment. That is, in reinforcing the formed member by filling the foam, it is possible to allow the foam to be fixed to the formed member with a relatively simple configuration, and to obtain a high reinforcing effect by filling of the foam.

Particularly, with respect to a frame body having a closed section shape constituting a part of a body of an automobile, it is possible to improve the strength and rigidity of the frame body of the car body and the energy absorbing property at the time of application of a collision load.

Furthermore, since the density of the foam material is set at 0.6 [g/cm$^3$] or less, smaller weight and higher energy absorbing capability are realized compared to the case where reinforcement is achieved by using a steel sheet. Moreover, since the foam material is an epoxy resin, it is possible to perform the filling operation into the formed member easily and securely by utilizing the expandability of the resin.

In the present concrete example, as the panel material constituting the frame, the material based on a JSH270C steel sheet defined by the Japan Iron and Steel Federation Standard (JFS) and containing a predetermined amount of at least one element of the above-mentioned nitriding elements is used, and by subjecting this material to a nitriding treatment, at least the surface and the vicinity of the predetermined region were made porous (so-called porous state), and by allowing the foam material to set and expand in this predetermined region, extremely high adhesion force is realized to thereby further improve the reinforcing effect by filling of the foam. However, as the panel material constituting the frame, by using a JSC260G steel sheet (Table 2: Specimen c) in place of the above-mentioned JSH270C steel sheet, in addition to the reinforcing effect due to the improvement of adhesion force between the foam and the panel material, since the panel material (steel sheet) itself is strengthened more efficiently by the nitriding treatment (compared to the JSH270C steel sheet) as described above, it is possible to further improve the strength of the frame.

Next, a concrete example of a metal formed member by a so-called hydroform process in which a metal member is formed by using a hydraulic pressure of fluid will be explained.

FIGS. 23A to 23D are explanatory views schematically show a series of processes in the case of producing, for example, a so-called perimeter frame constituting a part of a suspension of an automobile by employing the above-mentioned hydroform process.

Figure 23A:
FIG. 23A is one of a series of process explanatory views for explaining a method for producing a metal formed member by hydroform process.

First, as shown in FIG. 23A, a straight steel pipe-like member F1 having a predetermined wall thickness is prepared as a metal material of closed section shape. This pipe-like member F1 is made of a nitriding steel. The pipe-like member may be formed by welding after winding a flat steel sheet having a predetermined wall thickness.

Figure 23B:
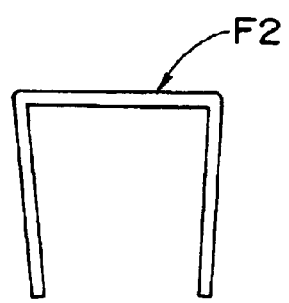
FIG. 23B is one of a series of process explanatory views for explaining the method for producing the metal formed member by the hydroform process.
Figure 23C:
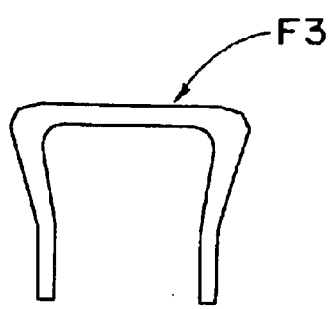
FIG. 23C is one of a series of process explanatory views for explaining the method for producing the metal formed member by the hydroform process.
Figure 23D:
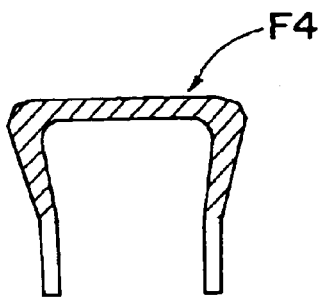
FIG. 23D is one of a series of process explanatory views for explaining the method for producing the metal formed member by the hydroform process.

Next, a shown in FIG. 23B, this pipe-like member F1 was press formed to form a preform F2 having a shape relatively approximate to the final shape (See FIGS. 23C and 23D) of the formed member (perimeter frame).

After setting the preform F2 in a predetermined mold (not shown) for hydroform process, a predetermined fluid (for example, hydraulic pressure oil) is supplied into the closed section of the preform F2, and the fluid is pressurized to a predetermined pressure by means of the pressure device (not shown). As a result, the preform F2 plastically deforms because of the above inner pressure, so that a metal formed member F3 having a shape corresponding to the mold surface shape of the mold can be obtained (See FIG. 23C). That is, the preform F2 is hydroformed to generate the metal formed member F3.

Then, by hardening the predetermined region of the metal formed member F3 by a nitriding treatment, it is possible to obtain a perimeter frame F4 of which a specific region(See the diagonally hatched portion in FIG. 23D) is strengthened by the nitriding treatment.

In this way, since only the specific region of the metal formed member (perimeter frame F4) is hardened by the heat treatment, it is possible to harden and strengthen only a desired portion of the one-piece metal formed member F4 with reliability.

As the method for strengthening only a specific region by a nitriding treatment as described above, various methods can be considered.

Figure 24A:
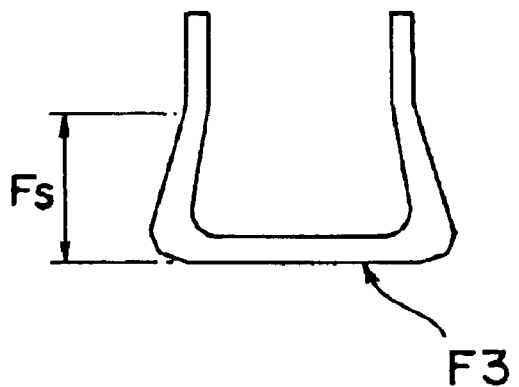
FIG. 24A is one of a series of process explanatory views for explaining partial nitriding treatment in a method for producing a metal formed member by hydroform process.
Figure 24B:
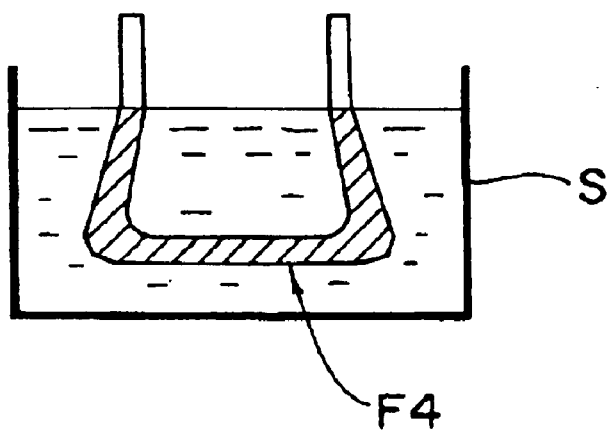
FIG. 24B is one of a series of process explanatory views for explaining the partial nitriding treatment in the method for producing the metal formed member by the hydroform process.

In the above concrete example, as shown in FIG. 24A and 24B, only a specific region Fs (strengthening region) to be strengthened in the formed member F3 formed by the hydroform process is immersed in the salt bath S in the salt bath nitriding process so as to effect the nitriding treatment only on this part.

In this way, since the heat treatment is performed while only the specific region Fs of the formed member F3 formed by the hydroform process is immersed in the salt bath S, it is possible to harden and strengthen only the specific region Fs of the metal formed member F4 with reliability by the heat treatment without necessity of providing another process.

Figure 25A:
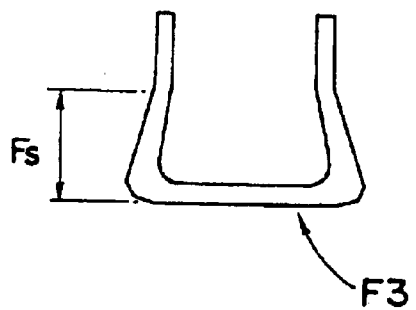
FIG. 25A is one of a series of process explanatory views for explaining another example of partial nitriding treatment in the above method.
Figure 25B:
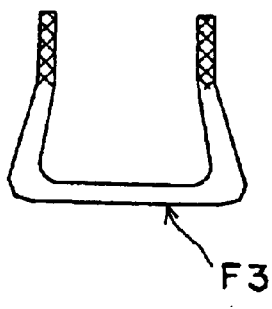
FIG. 25B is one of a series of process explanatory views for explaining another example of the partial nitriding treatment in the above method.
Figure 25C:
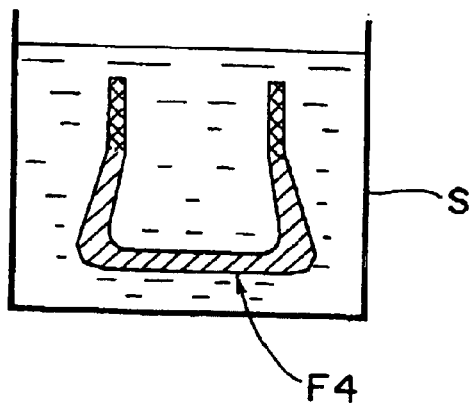
FIG. 25C is one of a series of process explanatory views for explaining another example of the partial nitriding treatment in the above method.

Alternatively, as shown in FIGS. 25A to 25C, it is also possible that prior to performing a nitriding treatment, the formed member F3 formed by the hydroform process is subjected to a masking treatment, that is, the region not to be strengthened (non-strengthening region) is covered with a suitable masking material (including, for example, films such as plating films) (See the cross hatched part in FIG. 25B), and thereafter the entire formed member F3 formed by the hydroform process is immersed in the salt bath S to thereby strengthen only the region Fs (strengthening region) to be strengthened which is not covered with the masking material is strengthened by the nitriding treatment.

As described above, since the masking treatment is performed on the part other than the specific region Fs of the formed member F3 formed by the hydroform process prior to the heat treatment, it is possible to harden and strengthen only the specific region Fs of the metal formed member F4 reliably and readily by the heat treatment.

As described above, according to the present concrete example, since the preform F2 having a closed section shape which is relatively approximate to the final shape of the metal formed member F4 is located in the predetermine mold, and by supplying the closed section space of the preform F2 with a pressurized fluid, the metal formed member F3 is hardened by the heat treatment after forming the metal formed member F3 corresponding to the shape of the mold, it is possible to ensure satisfactory plastic formability at the time of forming before the heat treatment. And then, by the heat treatment conducted after the plastic forming, it is possible to provide the specific region Fs of the formed member F4 with a desired strength.

That is, in obtaining a metal formed member by employing the so-called hydroform process, it is possible to reliably obtain the metal formed member F4 having satisfactory strength.

Furthermore, in this case, since only the specific region of the metal formed member (perimeter frame F4) is hardened by the heat treatment, it is possible to reliably harden and the strengthen only a desired portion of the one-piece metal formed member F4.

It is to be understood that the present invention is not limited to the above embodiments and concrete examples, and various modifications and improvement in design are possible without departing from the concept of the present invention.

What is claimed is:

1. A method for producing a formed member made of a steel sheet comprising the steps of:
   preparing a steel sheet material having tensile strength of 500 MPa or less and containing a nitriding element;
   forming a formed member having a predetermined shape by performing a plastic forming on the steel sheet material;
   performing a nitriding treatment on the formed member so that an average hardness in the sheet thickness direction of the resultant steel sheet member is Hv 300 or more by Vickers hardness; and
   wherein only a specific region of the formed member is strengthened by the nitriding treatment, and when the formed member deforms by bending, the formed member deforms at a boundary between the specific region and an unspecific region as an origin.

2. The method for producing a formed member made of a steel sheet according to claim 1, wherein the steel sheet material contains as the nitriding element, a predetermined amount of at least one element of titanium (Ti), niobium (Nb), boron (B), vanadium (V) and aluminum (Al).

3. The method for producing a formed member made of a steel sheet according to claim 1, wherein the difference in hardness between a surface part and an inside center part in the thickness direction of the steel sheet member of the formed member is Hv 200 or less by Vickers hardness.

4. The method for producing a formed member made of a steel sheet according to claim 1, wherein before the nitriding treatment, a masking treatment is performed on a part other than the specific region of the formed member.

5. The method for producing a formed member made of a steel sheet according to claim 1, wherein the nitriding treatment is performed while only the specific region of the formed member is immersed in a salt bath.

6. A method for producing a formed member made of a steel sheet for a vehicle body comprising the steps of:
   preparing a steel sheet material having tensile strength of 500 MPa or less and containing a nitriding element;
   wherein the steel sheet material contains as the nitriding element, a predetermined amount of at least one element of titanium (Ti), niobium (Nb), boron (B), vanadium (V) and aluminum (Al);
   forming a formed member for a vehicle body having a predetermined shape by performing a plastic forming on the steel sheet material; and
   performing a nitriding treatment on the formed member so that an average hardness in the sheet thickness direction of the resultant steel sheet member is Hv 300 or more by Vickers hardness;
   wherein the difference in hardness between a surface part and an inside center part in the thickness direction of the steel sheet member of the formed member is Hv 200 or less by Vickers hardness, and only a specific region of the formed member for a vehicle body is strengthened by the nitriding treatment.

7. The method for producing a formed member made of a steel sheet for a vehicle body according to claim 6, wherein a plurality of strengthened regions are aligned in a specified direction with unstrengthened regions interposed therebetween.

8. A method for producing a formed member made of a steel sheet for a vehicle body comprising the steps of:

preparing a steel sheet material having tensile strength of 500 MPa or less and containing a nitriding element;

wherein the steel sheet material contains as the nitriding element, a predetermined amount of at least one element of titanium (Ti), niobium (Nb), boron (B), vanadium (V) and aluminum (Al);

forming a formed member for vehicle body of a predetermined shape having a closed section by performing a plastic forming on the steel sheet material; and performing a nitriding treatment on a specified region of the formed, member so that an average hardness in the sheet thickness direction of the resultant steel sheet member is Hv 300 or more by Vickers hardness;

wherein the difference in hardness between a surface part and an inside center part in the thickness direction of the steel sheet member of the formed member Hv 200 or less by Vickers hardness;

setting a foam material by adhesion to at least the specified a region made porous by the nitriding treatment; and causing the foam material to expand by heating the formed member, thereby filling the closed section space thereof with expanded foam material and reinforcing the formed the for a vehicle body.

9. A method for producing a formed member made of steel sheet for a vehicle body comprising the steps of:

forming a preform having a pipe-like shape which is relatively approximate to a final shape of the formed member;

wherein the perform is made of a steel material having tensile strength of 500 MPa or less and containing, as a nitriding element, a predetermined amount of at least one element of titanium (Ti), niobium (Nb), boron (B), vanadium (V) and aluminum (Al);

setting the preform in a predetermined mold;

forming the preform by supplying the closed section space thereof with a pressurized fluid to perform a plastic forming on the preform, thereby obtaining the formed member corresponding to a shape of the mold; and performing a nitriding treatment on the formed member so that an average hardness in the material thickness direction of the resultant steel member is Hv 300 or more by Vickers hardness;

wherein the difference in hardness between a surface part and an inside center part in the thickness direction of the steel member of the formed member is Hv 200 or less by Vickers hardness, and only a specific region of the formed member for a vehicle body is strengthened by the nitriding treatment.

10. A formed member made of a steel sheet for a vehicle body having an average hardness in the sheet thickness direction of Hv 300 or more by Vickers hardness by plastically forming a steel sheet into a predetermined shape and performing a nitriding treatment after the plastic forming;

wherein the steel sheet material has a tensile strength of 500 MPa or less and contains as a nitriding element, a predetermined amount of at least one element of titanium (Ti), niobium (Nb), boron (B), vanadium (V) and aluminum (Al);

wherein a difference in hardness between a surface part and an inside center part in the thickness direction of the steel sheet member of the formed member is Hv 200 or less by Vickers hardness; and wherein only a specific region of the formed member for a vehicle body is strengthened by the nitriding treatment.

11. A formed member made of a steel sheet for a vehicle body according to claim 10, wherein a plurality of strengthened regions are aligned in a specified direction with unstrengthened regions interposed therebetween.

12. A formed member made of a steel sheet for a vehicle body having an average hardness in the sheet thickness direction of Hv 300 or more by Vickers hardness by plastically forming a steel sheet into a predetermined shape and performing a nitriding treatment after the plastic forming;

wherein the steel sheet material has a tensile strength of 500 MPa or less and contains as a nitriding element, a predetermined amount of at least one element of titanium (Ti), niobium (Nb), boron (B), vanadium (V) and aluminum (Al), wherein a difference in hardness between a surface part and an inside center part in the thickness direction of the steel sheet member of the formed member is Hv 200 or less by Vickers hardness;

wherein only a specific region of the formed member for a vehicle body is strengthened by the nitriding treatment; and wherein the formed member has a closed section shape and at least a part of an internal space of the formed member is filed with foamed material by setting a foam material by adhesion to at least the specified region made porous by the nitriding treatment and causing the foam material to expand by heating the formed member, thereby filling the closed section space thereof with expanded foam material and reinforcing the formed member for vehicle body.

13. A formed member made of steel sheet for a vehicle having an average hardness in the sheet thickness direction of Hv 300 or more by Vickers hardness by plastically forming steel material into a predetermined shape and performing a nitriding treatment after the plastic forming;

wherein the steel material has a tensile strength of 500 MPa or less and contains as a nitriding element, a predetermined amount of at least one element of titanium (Ti), niobium (Nb), boron (B), vanadium (V) and aluminum (Al);

wherein a difference in hardness between a surface part and an inside center part in the thickness direction of the steel member of the formed member is Hv 200 or less by Vickers hardness;

wherein only a specific region of the formed member for a vehicle body is strengthened by the nitriding treatment; and wherein the formed member is formed to a predetermined shape by forming a preform having a pipe-like shape which is relatively approximate to a final shape of the formed member, setting the preform in a predetermined mold, and forming the preform by supplying the closed section space thereof with a pressurized fluid to perform a plastic forming on the preform, thereby obtaining the formed member corresponding to a shape of the mold.

* * * * *